United States Patent
Zhang

(10) Patent No.: US 10,732,198 B2
(45) Date of Patent: Aug. 4, 2020

(54) INTEGRATED LINEAR AND ANGULAR MEMS ACCELEROMETERS

(71) Applicant: Analog Devices, Inc., Norwood, MA (US)

(72) Inventor: Xin Zhang, Acton, MA (US)

(73) Assignee: Analog Devices, Inc., Norwood, MA (US)

( * ) Notice: Subject to any disclaimer, the term of this patent is extended or adjusted under 35 U.S.C. 154(b) by 88 days.

(21) Appl. No.: 15/673,361

(22) Filed: Aug. 9, 2017

(65) Prior Publication Data

US 2019/0049481 A1 Feb. 14, 2019

(51) Int. Cl.
*G01P 15/125* (2006.01)
*G01P 15/18* (2013.01)
*G01P 15/08* (2006.01)

(52) U.S. Cl.
CPC ............ *G01P 15/125* (2013.01); *G01P 15/18* (2013.01); *G01P 2015/084* (2013.01); *G01P 2015/0831* (2013.01); *G01P 2015/0857* (2013.01)

(58) Field of Classification Search
CPC .................. G01P 15/125; G01P 15/18; G01P 2015/0831; G01P 2015/084; G01P 2015/0857
See application file for complete search history.

(56) References Cited

U.S. PATENT DOCUMENTS

| | | |
|---|---|---|
| 5,251,484 A | 10/1993 | Mastache |
| 5,349,858 A | 9/1994 | Yagi et al. |
| 5,415,040 A | 5/1995 | Nottmeyer |
| 5,656,778 A | 8/1997 | Roszhart |
| 6,032,531 A | 3/2000 | Roszhart |
| 6,082,197 A | 7/2000 | Mizuno et al. |
| 6,393,914 B1 | 5/2002 | Zarabadi et al. |

(Continued)

FOREIGN PATENT DOCUMENTS

| | | |
|---|---|---|
| CN | 1813192 A | 8/2006 |
| CN | 1813194 A | 8/2006 |

(Continued)

OTHER PUBLICATIONS

Extended European Search Report dated Jun. 9, 2017 in connection with European Application No. EP 16206408.3.

(Continued)

*Primary Examiner* — Robert R Raevis
(74) *Attorney, Agent, or Firm* — Wolf, Greenfield & Sacks, P.C.

(57) ABSTRACT

An electromechanical system (MEMS) accelerometer is described. The MEMS accelerometer may be configured to sense linear acceleration along one, two or three axes, and to sense angular acceleration about one, two or three axes. As such, the MEMS accelerometer may serve as 2-axis, 3-axis, 4-axis, 5-axis or 6-axis inertial accelerometer. In some embodiments, the MEMS accelerometer may comprise a single mass connected to at least one anchor via a plurality of tethers. In other embodiments, the MEMS accelerometer may comprise a proof mass connected to at least one anchor via a plurality of tethers and one or more shuttle masses connected to the proof mass via a second plurality of tethers. Rotational and linear motion of the MEMS accelerometer may be sensed using capacitive sensors.

20 Claims, 21 Drawing Sheets

(56) References Cited

U.S. PATENT DOCUMENTS

| | | | |
|---|---|---|---|
| 6,520,017 B1* | 2/2003 | Schoefthaler | G01P 15/0802 |
| | | | 73/514.02 |
| 6,845,670 B1 | 1/2005 | McNeil et al. | |
| 7,793,542 B2 | 9/2010 | Schultz | |
| 7,934,423 B2* | 5/2011 | Nasiri | G01P 15/0802 |
| | | | 73/514.02 |
| 8,739,626 B2 | 6/2014 | Acar | |
| 8,813,564 B2 | 8/2014 | Acar | |
| 8,960,002 B2 | 2/2015 | Nasiri et al. | |
| 8,984,941 B2* | 3/2015 | Netzer | G01P 15/125 |
| | | | 73/510 |
| 9,003,885 B2 | 4/2015 | Pan et al. | |
| 9,010,185 B2 | 4/2015 | Tsai et al. | |
| 9,062,972 B2 | 6/2015 | Acar et al. | |
| 9,601,278 B2 | 3/2017 | Jiang et al. | |
| 9,620,698 B2 | 4/2017 | Lane et al. | |
| 9,620,700 B2 | 4/2017 | Chen | |
| 2002/0109207 A1 | 8/2002 | Rich et al. | |
| 2003/0159512 A1 | 8/2003 | Zarabadi et al. | |
| 2006/0037397 A1 | 2/2006 | Memishian | |
| 2010/0300204 A1* | 12/2010 | Reinmuth | G01P 15/125 |
| | | | 73/514.32 |
| 2012/0240679 A1 | 9/2012 | Netzer et al. | |
| 2013/0247666 A1 | 9/2013 | Acar | |
| 2014/0001580 A1 | 1/2014 | Bolognia et al. | |
| 2014/0190543 A1 | 7/2014 | Chen | |
| 2014/0205127 A1 | 7/2014 | Khenkin et al. | |
| 2014/0211957 A1 | 7/2014 | Bolognia et al. | |
| 2014/0246066 A1 | 9/2014 | Chen et al. | |
| 2015/0041929 A1 | 2/2015 | Bolognia | |
| 2015/0355222 A1* | 12/2015 | Zhang | G01P 15/125 |
| | | | 73/514.32 |
| 2016/0064149 A1 | 3/2016 | Jiang et al. | |
| 2016/0064637 A1 | 3/2016 | Cornett et al. | |
| 2016/0099208 A1 | 4/2016 | Chen | |
| 2016/0104581 A1 | 4/2016 | Jiang et al. | |
| 2016/0133816 A1 | 5/2016 | Cornett et al. | |
| 2016/0204492 A1 | 7/2016 | Jiang et al. | |
| 2017/0025594 A1 | 1/2017 | McGuinness et al. | |
| 2017/0084888 A1 | 3/2017 | Chen | |
| 2017/0117824 A1 | 4/2017 | Jiang et al. | |
| 2017/0141668 A1 | 5/2017 | Xing et al. | |

FOREIGN PATENT DOCUMENTS

| | | |
|---|---|---|
| CN | 101216308 A | 7/2008 |
| CN | 102375075 A | 3/2012 |
| CN | 102597699 A | 7/2012 |
| CN | 10267996 | 9/2012 |
| CN | 103221779 A | 7/2013 |
| CN | 106950398 A | 7/2017 |
| CN | 109387668 A | 2/2019 |
| EP | 1 083 144 A1 | 3/2001 |
| EP | 1 207 371 A1 | 5/2002 |
| EP | 1 340 985 A1 | 9/2003 |
| JP | H09-89927 A | 4/1997 |
| JP | 2008-509405 A | 3/2008 |
| JP | 2013-007622 A | 1/2013 |
| JP | 2017-122727 A | 7/2017 |
| JP | 2020052049 A2 | 2/2020 |
| WO | WO 01/59465 A1 | 8/2001 |
| WO | WO 2006/023476 A1 | 3/2006 |

OTHER PUBLICATIONS

[No Author Listed], Making Sense of IoT Standards White Paper. Redbend. Mar. 2015; 11 pages.

Burdett, Ultra-Low-Power Wireless Systems. IEEE Solid-State Circuits Magazine. Jun. 25, 2015; Spring:18-28.

Lemkin et al., A 3-Axis Force Balanced Accelerometer Using a Single Proof-Mass. 1997 International Conference on Transducers. IEEE Solid State Sensors and Actuators. 1997; 4 pages.

\* cited by examiner

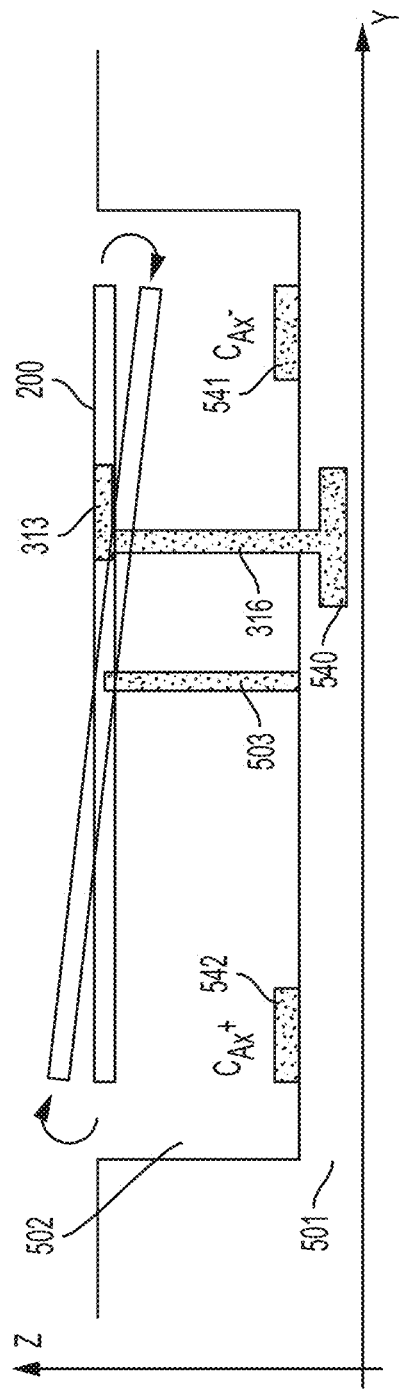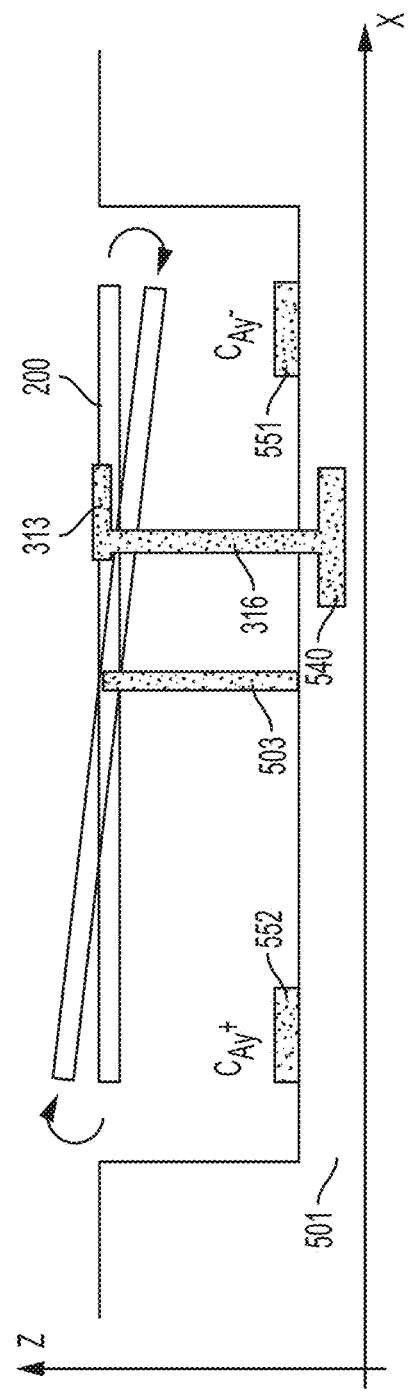
FIG. 5A
FIG. 5B

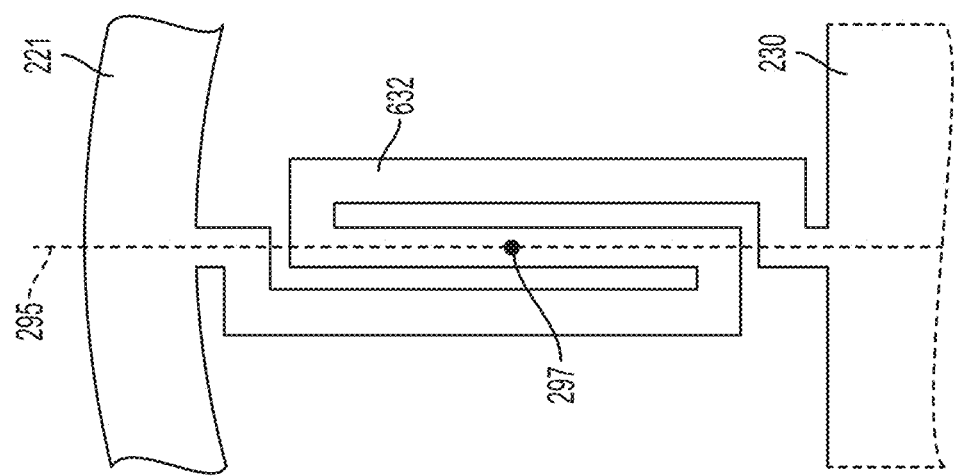

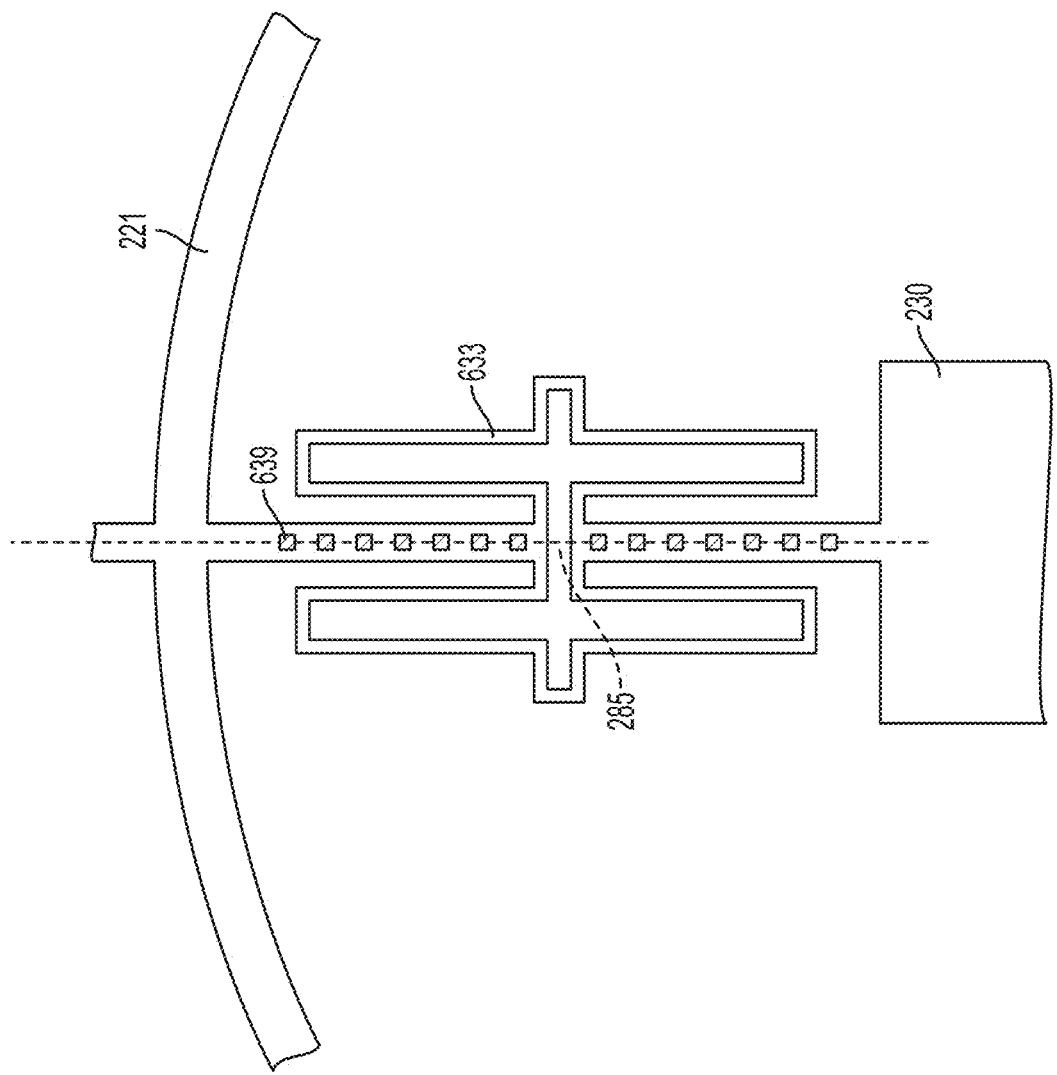

INTEGRATED LINEAR AND ANGULAR MEMS ACCELEROMETERS

FIELD OF THE DISCLOSURE

The present application relates to microelectromechanical systems (MEMS) accelerometers.

BACKGROUND

MEMS accelerometers include one or more proof masses for detecting acceleration. For example, some MEMS accelerometers include a proof mass configured to move in-plane for detecting acceleration in the plane of the proof mass, while other MEMS accelerometers include a proof mass configured to move out-of-plane for detecting acceleration perpendicular to the plane of the proof mass. Acceleration can be detected using capacitive sensors coupled to the proof mass.

SUMMARY OF THE DISCLOSURE

According to one aspect of the present application, an angular and linear accelerometer is provided. The angular and linear accelerometer may comprise at least one anchor connected to a substrate; a proof mass coupled to the at least one anchor via a plurality of tethers; a first capacitor configured to generate a first sense signal in response to rotational motion of the proof mass; and a second capacitor configured to generate a second sense signal in response to linear motion of the proof mass.

According to another aspect of the present application, a method for sensing angular and linear acceleration is provided. The method may comprise sensing rotational motion of a proof mass connected to a substrate via at least one anchor by generating, through a first sense capacitor, a first sense signal in response to angular acceleration about a first rotational axis, and sensing linear motion of the proof mass by generating, through a second sense capacitor, a second sense signal in response to linear acceleration along a first axis.

According to yet another aspect of the present application, an angular and linear accelerometer is provided. The angular and linear accelerometer may comprise at least one anchor connected to a substrate; a proof mass coupled to the at least one anchor via a first plurality of tethers; a shuttle mass coupled to the proof mass via a second plurality of tethers; a first sense capacitor formed at least partially from the proof mass, the first sense capacitor being configured to generate a first sense signal in response to angular motion of the proof mass; and a second sense capacitor formed at least partially from the shuttle mass, the second sense capacitor being configured to generate a second sense signal in response to motion of the shuttle mass.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 5A is the side view taken in a yz-plane of an angular accelerometer comprising a proof mass, an anchor and x-sensing electrodes, according to a non-limiting embodiment of the present application.

FIG. 5B is the side view taken in an xz-plane of an angular accelerometer comprising a proof mass, an anchor and y-sensing electrodes, according to a non-limiting embodiment of the present application.

FIG. 6A is a top view illustrating schematically an asymmetric tether, according to a non-limiting embodiment of the present application.

FIG. 6B is a top view illustrating schematically a symmetric tether, according to a non-limiting embodiment of the present application.

DETAILED DESCRIPTION

Applicant has appreciated that detection of linear and angular acceleration may be performed using a single microelectromechanical system (MEMS) device, which may be implemented for example as an accelerometer having a single proof mass or a plurality of masses elastically connected to one another. Compared to conventional systems, in which the angular accelerometer and the linear accelerometer form separate devices, MEMS accelerometers of the types described herein are more compact, and as such allow for substantial reductions in space usage (e.g., space used on a substrate) and costs.

MEMS accelerometers of the types described herein may be used in a variety of systems in which it is desirable to detect angular acceleration and linear acceleration, or the lack thereof. Devices incorporating these MEMS accelerometers may be used in an Internet of Things (IoT) network. For instance, wearable devices, including fitness sensors and healthcare monitors, industrial equipment and diagnostic tools, military equipment, and healthcare monitoring equipment may employ accelerometers of the types described herein.

Figure 1:
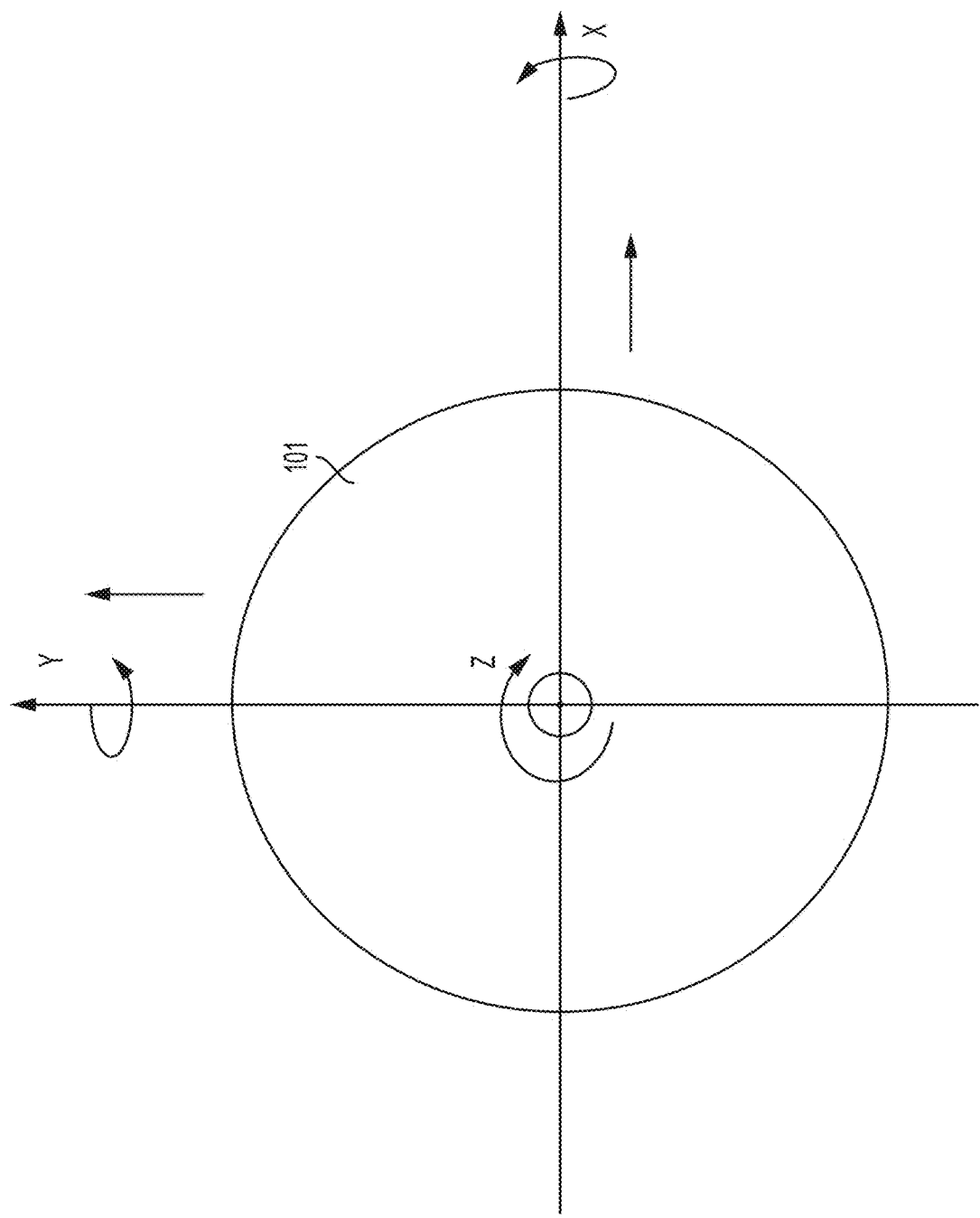
FIG. 1 illustrates schematically a MEMS accelerometer for sensing angular and linear acceleration, according to some non-limiting embodiments.

According to some aspects of the present application, a MEMS accelerometer may comprise a single device configured to detect angular acceleration about one, two or three axes and linear acceleration about one, two or three axes. FIG. 1 illustrates schematically a MEMS accelerometer 101 configured to detect angular acceleration about the x-axis, the y-axis and/or the z-axis, and linear acceleration in directions parallel to the x-axis, the y-axis and/or the z-axis. As such, MEMS accelerometer 101 may be configured to operate as a 2-axis inertial sensor (e.g., 1-axis angular accelerometer and 1-axis linear accelerometer), as a 3-axis inertial sensor (e.g., 2-axis angular accelerometer and 1-axis linear accelerometer, or 1-axis angular accelerometer and 2-axis linear accelerometer), as a 4-axis inertial sensor (e.g., 2-axis angular accelerometer and 2-axis linear accelerometer, 1-axis angular accelerometer and 3-axis linear accelerometer, or 3-axis angular accelerometer and 1-axis linear accelerometer), as a 5-axis inertial sensor (e.g., 3-axis angular accelerometer and 2-axis linear accelerometer or 2-axis angular accelerometer and 3-axis linear accelerometer), or as a 6-axis inertial sensor (e.g., 3-axis angular accelerometer and 3-axis linear accelerometer), which is also referred to herein as a "six degree of freedom (6-DOF) accelerometer.

In some embodiments, MEMS accelerometer 101 comprises a single mass, which may be connected to an underlying substrate via one or more anchors. In other embodiments, MEMS accelerometer 101 may comprise a plurality of masses elastically coupled to one another. One of these masses (the proof mass) may be connected to the substrate via one or more anchors and the other proof mass(es) (the shuttle masses) may be connected to the proof mass, for example via one or more springs. Examples of these configurations are provided below. Of course, MEMS accelerometers of the types described herein are not limited to any specific number of masses, or to any specific arrangement unless otherwise stated.

In some embodiments, a MEMS accelerometer having a single proof mass may be used to detect angular as well as linear acceleration. The MEMS accelerometer may be connected to one or more anchors (connected to an underlying substrate), via one or more tethers. The tethers may respond, for example by torqueing, flexing, deforming, stretching or compressing, in response to linear as well as angular acceleration. That is, the tethers may be shared between the linear sensing element(s) and the angular sensing elements(s). One example of such an arrangement is depicted in FIG. 2.

Figure 2:
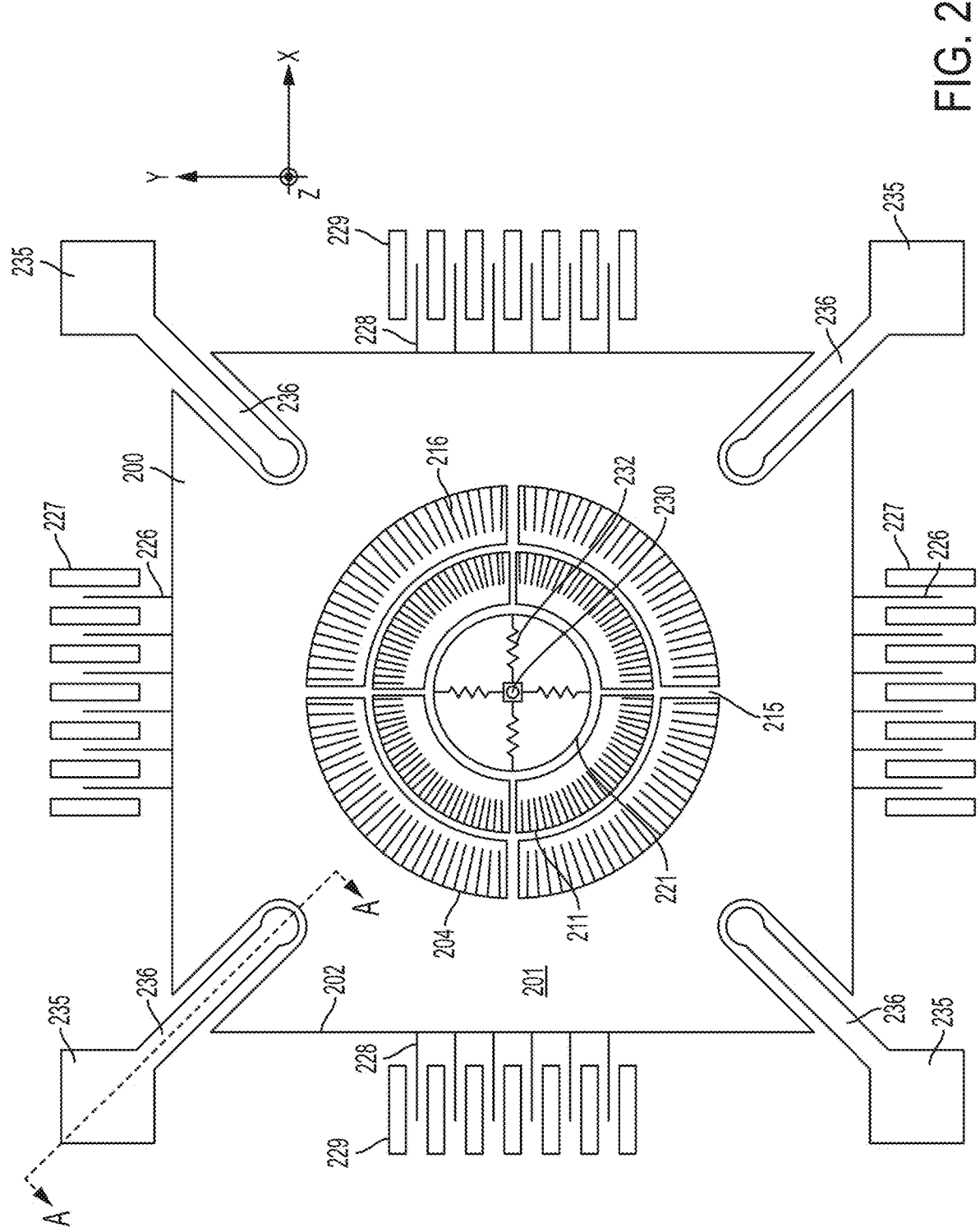
FIG. 2 illustrates schematically a representative MEMS accelerometer for sensing angular and liner acceleration having a single proof mass, according to some non-limiting embodiments.

FIG. 2 illustrates schematically a MEMS accelerometer for detecting angular and linear acceleration, according to some non-limiting embodiments. As illustrated, the MEMS accelerometer comprises a single proof mass 200, fixed structures 235, beams 236, central portion 230, tethers 232, mass portions 201, 211 and 221, beams 215, angular z-sensing beams 216, linear x-sensing beams 226, and linear y-sensing beams 228.

Proof mass 200 may be made of (at least in part) a conductive material, such as silicon, doped silicon, polysilicon or doped polysilicon. The silicon and/or polysilicon may be n-doped and/or p-doped with a doping concentration between $10^{16}$ cm$^{-3}$ and $5 \times 10^{20}$ cm$^{-3}$ in some embodiments, between $10^{18}$ cm$^{-3}$ and $10^{20}$ cm$^{-3}$ in some embodiments, between $5 \times 10^{18}$ cm$^{-3}$ and $5 \times 10^{19}$ cm$^{-3}$ in some embodiments, or between any suitable values or range of values. Other values are also possible. In alternative, other conductive materials can be used.

Proof mass 200 may have any suitable shape, including but not limited to a polygon (e.g., a rectangle or a square) a disc or an ellipses. In some embodiments, proof mass 200 may comprise one or more mass portions, such as mass portions 201, 211 and 221. Mass portions 211 and 221 may arranged in a ring-like configuration, and may form concentric rings in some embodiments, though not all embodiments are limited in this respect. Mass portion 201 may be disposed near the periphery of proof mass 200. FIG. 2 illustrates a proof mass 200 having three mass portions. However the application is not limited to any specific number of mass portions. Each mass portion may have an inner edge and an outer edge. Each outer edge may bound an area that comprises the respective inner edge. For example, mass portion 201 may have an outer edge 202, bounding an area that comprises inner edge 204. The various mass portions may be connected through one or more supporting beams, such as supporting beam 215. While FIG. 2 illustrates a proof mass having four supporting beams, any other suitable number of supporting beams may be used. The supporting beams may have a rectangular shape, as illustrated in the figure, or any other suitable shape.

In some embodiments, proof mass 200 may comprise a central portion 230. Central portion 230 may define an area that encloses the center of proof mass 200, in some embodiments. In some embodiments, central portion 230 may be connected to one or more anchors (not shown in FIG. 2). The anchor(s) may be connected to the substrate. In some embodiments, in response to one or more torsions about the x-axis and/or the y-axis, the anchor(s) may function as pivoting fulcrum(s) for proof mass 200. Central portion 230 may have any suitable shape. For example, central portion 230 may have a square shape, a rectangular shape, a circular shape, an elliptical shape, etc.

In some embodiments, a plurality of tethers, such as tether 232, may connect central portion 230 to the inner mass portion. Examples of tethers are described further below. In some embodiments, the tethers may serve as springs configured to provide a restoring force in response to acceleration. The springs may act to restore the proof mass to its unperturbed position. The elastic constant of the tethers may depend on the shape of the tethers. The tethers may allow for motion of the proof mass 200 in response to acceleration. For example, when proof mass 200 experiences an angular acceleration about the x-axis, at least some of the tethers may torque out-of-plane thus allowing the proof mass to tilt about the x-axis. As another example, when proof mass 200 experiences an angular acceleration about the z-axis, the tethers may deform in the xy-plane thus allowing in-plane rotations of the proof mass. As yet another example, when proof mass 200 experiences a linear acceleration along the x-axis, some of the tethers may stretch along the x-axis and some of the tethers may contract along the x-axis, thus allowing displacements of the proof mass along the x-axis. As yet another example, when proof mass 200 experiences a linear acceleration along the z-axis, the tethers may flex out-of-plane, thus allowing the proof mass to move closer or away from the underlying substrate.

The MEMS accelerometer of FIG. 2 may be configured to detect angular acceleration about one, two, or three axes.

In some embodiments, proof mass 200 may comprise a plurality of beams such as angular z-sensing beam 216, to detect torsion(s) about the z-axis. In this application, the "beams" of the type illustrated in FIG. 2 may alternatively be referred to as "fingers", "clamped-free beams", and in some embodiments may be cantilevers. In some embodiments, the beams may be fixed to the inner edge of a mass portion, such as inner edge 204. In some embodiments, the beams may be suspended such that the regions where they contact inner edge 204 is their sole fixing point. In some embodiments, the beams may extend toward the center of proof mass 200. In some embodiments, the beams may extend radially toward the center of proof mass 200. In response to torsion(s) about the z-axis, the beams may pivot on the xy-plane about the regions where they contact inner edge 204. As will be discussed further below, as the beams move, a variation in a parameter, such as a capacitance, may be detected. Proof mass 200 may comprise any suitable number of angular z-sensing beams. In some embodiments, proof mass 200 may comprise a second set of beams contacting the inner edge of mass portion 211, as illustrated in FIG. 2. While FIG. 2 illustrates proof mass 200 as having two sets of beams, the application is not limited in this respect and any other suitable number of sets of beams greater than zero may be used. In some embodiments, the beams contacting mass portion 201 may be longer than the beams contacting mass portion 211. In some embodiments, the beams contacting mass portion 201 may have an angular pitch that is less than the angular pitch of the beams contacting mass portion 211.

Figure 3:
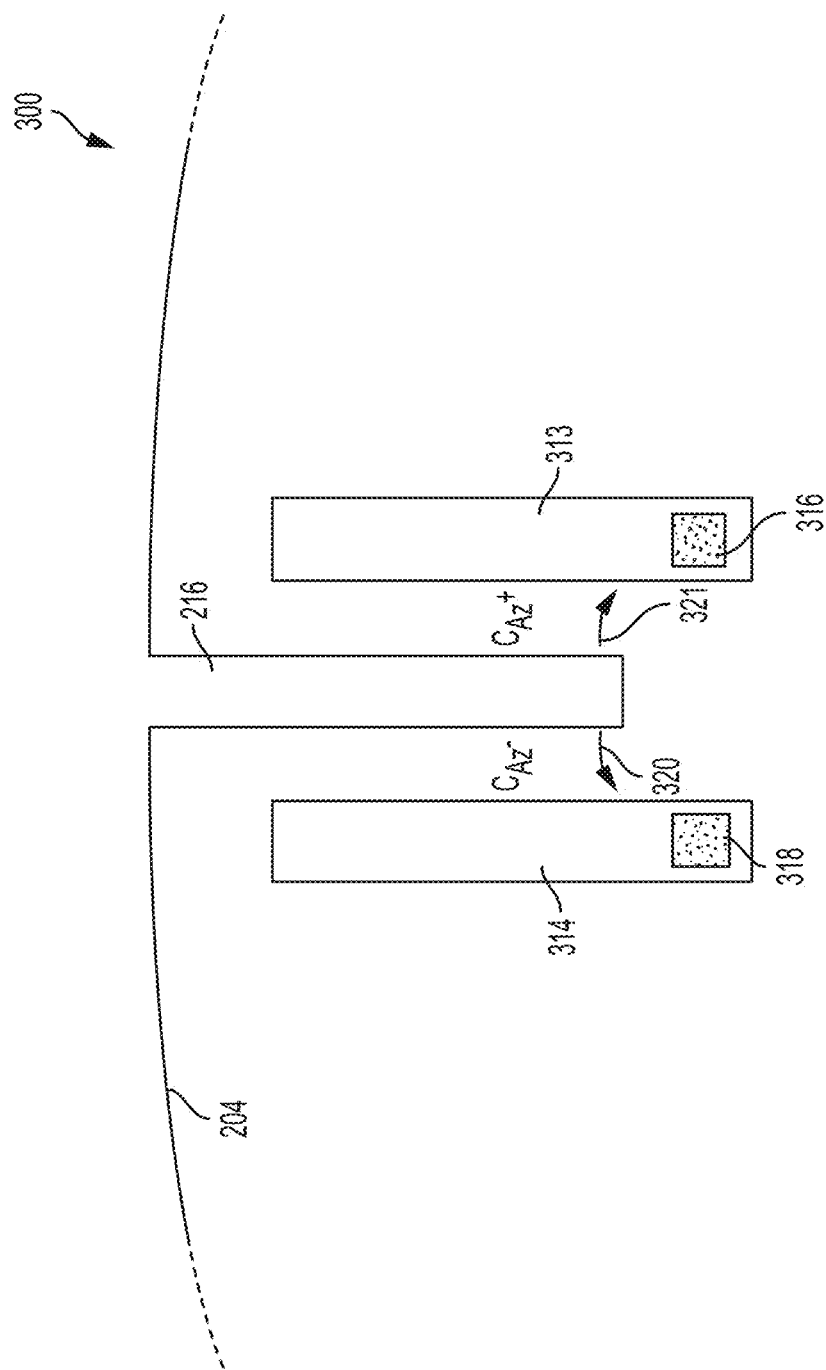
FIG. 3 is a top view of an angular z-sensing element comprising a beam having one end fixed to an inner edge of a proof mass, according to a non-limiting embodiment of the present application.

FIG. 3 is a top view of an angular z-sensing element 300 comprising a beam having one end fixed to an inner edge of a proof mass, according to a non-limiting embodiment of the present application. The angular z-sensing element 300 may comprise a beam 216 contacting inner edge 204. In some embodiments, beam 216 may be configured to move in the xy-plane, as illustrated by arrow 320 and arrow 321, in response to torsion(s) about the z-axis. In some embodiments, angular z-sensing element 300 may comprise electrode 313. Electrode 313 may be adjacent beam 216 in some embodiments. Electrode 313 may comprise a conductive material in some embodiments, such as aluminum, copper, doped silicon and/or doped polysilicon. In some embodiments, electrode 313 may be connected to post 316. Post 316 may be connected to a substrate. While FIG. 3 illustrates electrode 313 being connected to the substrate through one post, any other suitable number of posts greater than one may be used. In some embodiments, a capacitor $C_{Az}^+$ having electrode 313 and beam 216 as electrodes may be formed. As beam 216 moves in response to torsion(s) about the z-axis, the distance between beam 216 and electrode 313 may vary, thus causing a change in the capacitance associated with capacitor $C_{Az}^+$. The change in capacitance may be used to detect torsion(s) about the z-axis.

In some embodiments, angular z-sensing element 300 may comprise a second electrode 314, which may be connected to the substrate via post 318 and may be made of the same material as electrode 313. In some embodiments, a capacitor $C_{Az}^-$ having electrode 314 and beam 216 as electrodes may be formed.

In some embodiments, the change in the capacitance associated with capacitor $C_{Az}^-$ may be configured to be the opposite of the change in the capacitance associated with capacitor $C_{Az}^+$. For example, if $\Delta CA_z$ is the change in capacitance associated with capacitor $C_{Az}^-$ in response to torsion(s) about the z-axis, the change in capacitance associated with capacitor $C_{Az}^+$ may be equal to $-\Delta C_{Az}$. As a result, movements in the xy-plane may lead to the generation of differential signals.

Figure 4:
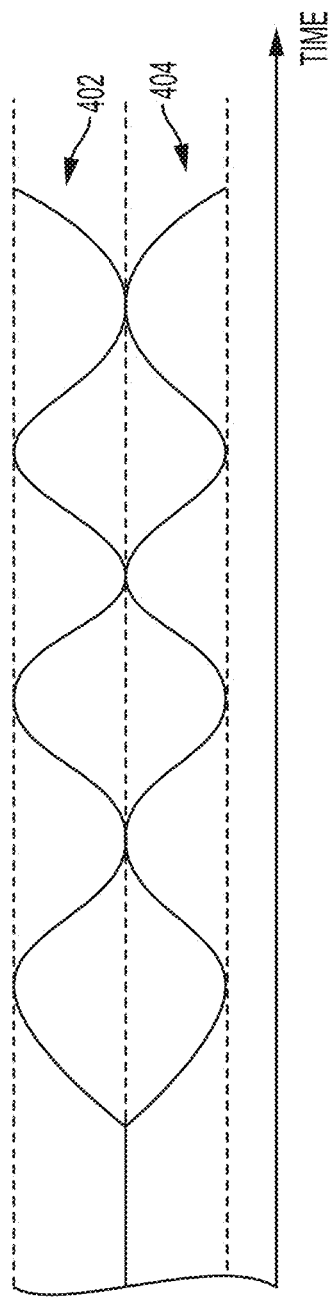
FIG. 4 illustrates an example of two differential signals generated by an angular z-sensing element, according to a non-limiting embodiment of the present application.

FIG. 4 illustrates an example of a differential signal generated by an angular z-sensing element, according to a non-limiting embodiment of the present application. In the non-limiting example of FIG. 4, a sinusoidal torsion may be applied to proof mass 200 about the z-axis. In response to such torsion, beam 216 may move over time according to arrows 320 and 321, thus causing a change over time in the capacitance associated to capacitor $C_{Az}^+$ that is sinusoidal, and an opposite change in the capacitance associated to capacitor $C_{AZ}^-$. The change in the two capacitances may cause the generation of differential signals 402 and 404, as illustrated in FIG. 4. In some embodiments, using differential signals may be preferable over using single-ended signals to suppress common mode signals. For examples, common mode signals may be caused by linear acceleration occurring with respect to the z-axis, by substrate deformations and/or by noise. In another example, common mode signals may be caused by the cross talk occurring between two modes associated with two respective orthogonal axes.

Torsion(s) about the x-axis and y-axis may be detected using sense capacitors, wherein one electrode of these sense capacitors may be disposed on the substrate. In this way, out-of-plane angular motion of the proof mass may be detected by sensing variations in the distance between a portion of the proof mass and the substrate. FIG. 5A is a side view, taken in a yz-plane, of a MEMS accelerometer comprising a proof mass 200, an anchor 503 and angular x-sensing electrodes 541 and 542, according to a non-limiting embodiment of the present application. In some embodiments, proof mass 200 may be disposed within a cavity 502, formed on a substrate 501. For example, cavity 502 may be obtained by etching a portion of substrate 501. Substrate 501 may be a silicon substrate in some embodiments. In some embodiments, proof mass 200 may be connected to substrate 501 through an anchor 503. In some embodiments, anchor 503 may be connected to central portion 230. The distance between the bottom surface of the proof mass and the top surface of the substrate, measured along the z-axis, may be between lam and 10 μm in some embodiments, between 1.5 μm and 3 μm in some embodiments, between 1.7 μm and 1.9 μm in some embodiments, or between any suitable values or range of values. Other values are also possible. Proof mass 200 may have a thickness, measured along the z-axis, that is between 1am and 50 μm in some embodiments, between 10 μm and 20 μm in some embodiments, between 15 μm and 17 μm in some embodiments, or between any suitable values or range of values. Other values are also possible.

FIG. 5A illustrates angular x-sensing electrodes 541 and 542 disposed on substrate 501, on opposite sides of anchor 503. In some embodiments, angular x-sensing electrodes 541 and 542 may be disposed at locations corresponding to the outer edge of proof mass 200, such as outer edge 202. In some embodiments, a capacitor $C_{Ax}^+$ having angular x-sensing electrode 542 and proof mass 200 as electrodes may be formed. In response to acceleration about the x-axis, proof mass 200 may pivot about the x-axis using anchor 503 as fulcrum. Consequently the distance between proof mass 200 and angular x-sensing electrode 542 may vary, thus causing a change in the capacitance associated with capacitance $C_{Ax}^+$. The change in the capacitance may be used to detect torsion(s) about the x-axis.

In some embodiments, a capacitor $C_{Ax}^-$ having angular x-sensing electrode 541 and proof mass 200 as electrodes may be formed. In response to acceleration about the x-axis, proof mass 200 may pivot about the x-axis using anchor 503 as fulcrum. Consequently the distance between proof mass 200 and angular x-sensing electrode 541 may vary, thus causing a change in the capacitance associated with capacitance $C_{Ax}^-$. The change in the capacitance may be used to detect torsion(s) about the x-axis.

In some embodiments, the change in the capacitance associated with capacitor $C_{Ax}^-$ may be configured to be the opposite of the change in the capacitance associated with capacitor $C_{Ax}^+$. For example, if $\Delta C_{Ax}$ is the change in capacitance associated with capacitor $C_x^-$, the change in capacitance associated with capacitor $C_x^+$ may be equal to $-\Delta C_{Ax}$. As a result, movements in the yz-plane may lead to the generation of differential signals.

FIG. 5A further illustrates an electrode 313, that may be part of an angular z-sensing element 300 as illustrated in FIG. 3. For simplicity, only one electrode 313 is illustrated in FIG. 5A. As discussed above, electrode 313 may be connected to substrate 501 through post 316. Post 316 may be made of a conductive material in some embodiments. In some embodiments, angular z-sensing electrode 540 may be disposed on substrate 501, and may be in electrical contact with electrode 313 via post 316. In some embodiments, electrode 540 may be disposed under the top surface of substrate 501.

In some embodiments, angular x-sensing electrode 541 may be positioned at any suitable location such that the distance between angular x-sensing electrode 541 and anchor 503 is greater than the distance between electrode 313 and anchor 503. Similarly, angular x-sensing electrode 542 may be positioned at any suitable location such that the distance between angular x-sensing electrode 542 and anchor 503 is greater than the distance between any one of the electrodes 313 and anchor 503.

Detection of angular acceleration about the y-axis may be performed in a similar fashion. FIG. 5B is a side view, taken in a xz-plane, of a MEMS accelerometer comprising a proof mass 200, an anchor 503 and angular y-sensing electrodes 551 and 552, according to a non-limiting embodiment of the present application. As illustrated, a capacitor $C_{Ay}^+$ may be formed between proof mass 200 and angular y-sensing electrode 552, and a capacitor $C_{Ay}^-$ may be formed between proof mass 200 and angular y-sensing electrode 551. Capacitors $C_{Ay}^+$ and $C_{Ay}^-$ may be responsive to angular acceleration about the y-axis and may operate in a same fashion as described in connection with capacitors $C_{Ax}^+$ and $C_{Ax}^-$.

In some embodiments, angular y-sensing electrode 551 may be positioned at any suitable location such that the distance between angular y-sensing electrode 551 and anchor 503 is greater than the distance between electrode 313 and anchor 503. Similarly, angular y-sensing electrode 552 may be positioned at any suitable location such that the distance between angular y-sensing electrode 552 and anchor 503 is greater than the distance between any one of the electrode 313 and anchor 503.

Figure 5C:
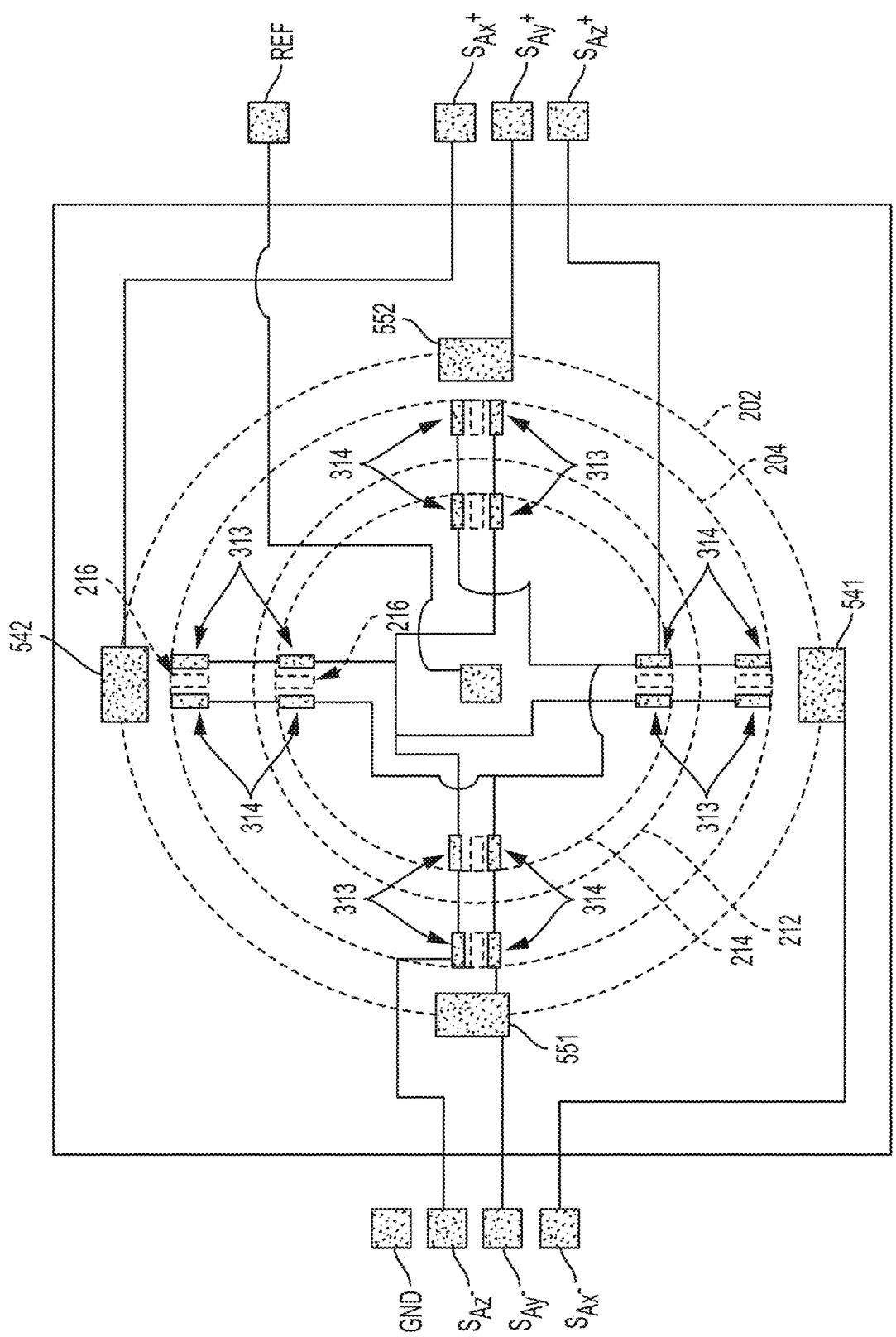
FIG. 5C is a top view of an angular accelerometer comprising x-sensing electrodes, y-sensing electrodes and z-sensing electrodes, according to a non-limiting embodiment of the present application.

FIG. 5C is a top view of a MEMS accelerometer comprising angular x-sensing electrodes, angular y-sensing electrodes and angular z-sensing electrodes, according to a non-limiting embodiment of the present application. The dashed lines corresponding to mass portion 201's inner edge 204 and outer edge 202, mass portion 211's inner edge 214 and outer edge 212 may be disposed on an xy-plane corresponding to a surface of proof mass 200. While FIG. 5C illustrates two mass portions, any suitable number of mass portions may be used.

In some embodiments, angular x-sensing electrodes 541 and 542 may be disposed on substrate 501, at locations corresponding to mass portion 201. In some embodiments, angular x-sensing electrodes 541 and 542 may be disposed at locations corresponding to outer edge 202. In some embodiments, angular x-sensing electrodes 541 and 542 may be disposed at opposite sides of mass portion 201. Angular x-sensing electrode 541 may be connected to metal pad $S_{Ax}^-$, which could be accessed via wire-bonding or through a probe. Similarly, angular x-sensing electrode 542 may be connected to metal pad $S_{Ax}^+$, which could be accessed via wire-bonding or through a probe. In some embodiments, metal pad ref may be connected to the anchor, and may be configured to provide a reference voltage.

In some embodiments, movements of proof mass 200 about the x-axis may cause the generation of a first voltage between metal pad $S_{Ax}^-$ and metal pad ref. In some embodiments, movements of proof mass 200 about the x-axis may cause the generation of a second voltage between metal pad $S_{Ax}^+$ and metal pad ref. In some embodiments, the two voltages may form two differential signals. Accordingly, as the proof mass pivots about anchor 503, the portion of mass portion 201 corresponding to angular x-sensing electrode 541 may move towards (or away from) angular x-sensing element 541, while at the same time the portion of mass portion 201 corresponding to angular x-sensing electrode 542 may move or away from (or towards) angular x-sensing element 542.

In some embodiments, angular y-sensing electrodes 551 and 552 may be disposed on substrate 501, at locations corresponding to mass portion 201. In some embodiments, angular y-sensing electrodes 551 and 552 may be disposed at locations corresponding to outer edge 202. In some embodiments, angular y-sensing electrodes 551 and 552 may be disposed at opposite sides of mass portion 201. Angular y-sensing electrode 551 may be connected to metal pad $S_{Ay}^-$, and angular y-sensing electrode 552 may be connected to metal pad $S_{Ay}^+$.

In some embodiments, a plurality of angular z-sensing elements, such as angular z-sensing element 300 described in connection with FIG. 3, may contact inner edge 204. While FIG. 5C illustrates four angular z-sensing elements, any suitable number of angular z-sensing elements may be used. In some embodiments, the angular z-sensing elements may comprise a beam 216 having an end fixed to inner edge 204. In some embodiments, the angular z-sensing elements may comprise electrodes 313 and 314 disposed on opposite sides of beam 216. Electrodes 313 and 314 may be connected to angular z-sensing electrodes (not shown in FIG. 5C) disposed on substrate 501 through post 316, and through post 318, respectively.

In some embodiments, all, or a portion of, the angular z-sensing electrodes coupled to electrodes 313 may be mutually connected as illustrated in FIG. 5C. Such angular z-sensing electrodes may be further connected to metal pad $S_{Az}^-$. In some embodiments, all, or a portion of, the angular z-sensing electrodes coupled to electrodes 314 may be mutually connected as illustrated in FIG. 5C. Such angular z-sensing electrodes may be further connected to metal pad $S_{Az}^+$. In some embodiments, movements of proof mass 200 about the z-axis may cause the generation of a first voltage between metal pad $S_Z^-$ and metal pad ref. In some embodiments, movements of proof mass 200 about the z-axis may cause the generation of a second voltage between metal pad $S_z^+$ and metal pad ref. In some embodiments, the two voltages may form two differential signals. Accordingly, as beams 216 move towards and away from electrodes 313 and 314, the capacitances associated to capacitors $C_{Az}^-$ and $C_{Az}^+$ may vary thus causing the generation of differential signals, such as differential signals 402 and 404 as shown in FIG. 4.

Figure 5D:
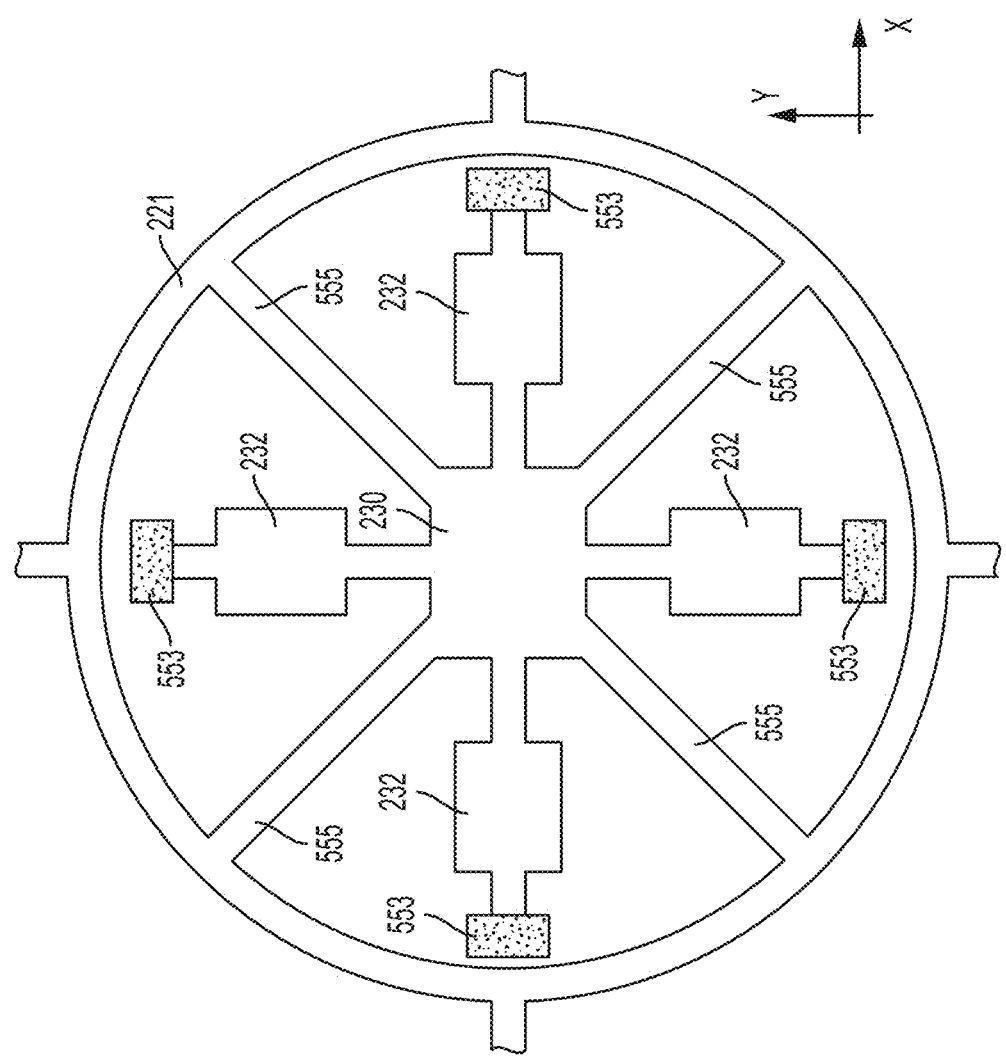
FIG. 5D is a top view illustrating a portion of an angular accelerometer having a plurality of anchors, according to some non-limiting embodiments.

In the embodiments described above, a single anchor is used to connect the proof mass to the substrate. In other embodiments, multiple anchors may be used. FIG. 5D is a top view illustrating a portion of a MEMS accelerometer having a plurality of anchors, according to some non-limiting embodiments. As illustrated, the MEMS accelerometer may comprise a central portion 230, tethers 232, anchors 553, and beams 555 connecting the mass portion 221, previously described in connection with FIG. 2. While FIG. 5D illustrates a MEMS accelerometer having four anchors, any other suitable number of anchors may be used. The anchors may be equally angularly offset with respect to one another. For example, in the embodiments in which four anchors are used, each anchor 553 may be angularly offset, relative to the adjacent anchors, by approximately 90° (e.g., between 89° and 91°, or between 85° and 95°). The radial distance between the center of central portion 230 and the location of the anchors may be chosen to provide a desired trade-off between response to linear acceleration and response to angular acceleration. For example, increasing such a radial distance may result in decreased crosstalk between angular and linear acceleration. However, larger radial distances may also cause a decrease in the sensitivity to angular acceleration due to an increase in the effective torsional stiffness of the proof mass.

In some embodiments, the anchors may be coupled to the proof mass via beams 555. For example, anchors 553 may be coupled to central portion 230 via tethers 232, and central portion 230 may be coupled to mass portion 221 via beams 555. Beams 555 may be stiffer than tethers 232 in some embodiments. In some embodiments, each beam 555 may be angularly offset, with respect to the adjacent anchors, by approximately 45° (e.g., between 44° and 46°, or between 40° and 50°). When angular acceleration about the z-axis occurs, tethers 232 may flex in the xy-plane thus allowing for motion of the proof mass. At the same time, beams 555 may rotate in the plane, thus causing rotations of the proof mass.

As described above, tethers 232 may exhibit an elastic constant configured to restore proof mass 200 to its unperturbed position. In some embodiments, tethers 232 may be further configured to absorb stress that may arise within proof mass 200. Accordingly, the tethers may be partially flexible, and may adjust their shapes based on the stress applied, thus reducing the stress received by the outer portions of the proof mass. In some embodiments, the tethers may be further configured to suppress non-orthogonal modes, such as diagonal modes. Tethers 232 may be asymmetric or symmetric.

FIG. 6A is a top view illustrating an asymmetric tether 632, according to some non-limiting embodiments. Asymmetric tether 632 may serve as any one of the tethers 232. In some embodiments, tether 632 may have serpentine shapes. In some embodiments, tether 632 may comprise elements having s-shapes. Tether 632 may further comprise first beams connecting the s-shaped elements to central portion 230 and second beams connecting the s-shaped elements to mass portion 221. In some embodiments, tethers 632 may be asymmetric about an axis, such as axis 295, that is parallel to a radius passing through the tether and the center of the proof mass. In some embodiments, tethers 632 may have a 180-degree rotational symmetry about a point located between central portion 230 and mass portion 221, such as point 297. In some embodiments, point 297 may be a midpoint between an edge of central portion 230 and the inner edge of mass portion 221. In some embodiments, tether 632 may be symmetric to the opposite tether with respect to an axis that passes through the center of the proof mass and is perpendicular to the axis of the tether. Such symmetry may be referred to as mirror symmetry.

Being asymmetric, tether 632 may give rise to torsions of the proof mass even when no angular accelerations are applied. This behavior may be undesirable, as it may lead to crosstalk. Thus, in some embodiments, symmetric tethers may be utilized, which in some embodiments are less susceptible to undesired torsions. Unlike asymmetric tethers, symmetric tethers may prevent torsions of the proof mass when no angular accelerations are applied. FIG. 6B illustrates an example of a symmetric tether, according to some non-limiting embodiments. Tether 633 may serve as any one of tethers 232. As illustrated, tether 633 may be symmetric with respect to symmetry axis 285.

In some embodiments, one or more holes 639 may be etched through a tether 633. For example, the hole(s) may be etched along symmetry axis 285, as illustrated in FIG. 6B. The shape and number of holes may be chosen to control the stiffness of tether 633 as desired. For example, increasing the size and/or the number of holes may decrease the stiffness of the tether in some embodiments.

In addition to detecting angular acceleration, the MEMS accelerometer depicted in FIG. 2 may be configured to detect linear acceleration along one, two, or three axes.

Linear acceleration along the z-axis may be detected by sensing variations in the distance between the proof mass 200 and the substrate. For example, when proof mass 200 experiences an acceleration along the z-axis, tethers 232 may flex out-of-plane thus allowing the proof mass to move closer or away from the substrate. The distance between the proof mass and the substrate may be sensed electrically using one or more sense z-sensing capacitors $C_{Lz}$, which may comprise an electrode disposed on the substrate, while the proof mass may serve as the second electrode.

In some circumstances, the shape of the substrate may be deformed in response to stress caused, for example, by the fact that the substrate and the package have different thermal expansion coefficients. As a result, the distance between the substrate and the proof mass may vary even though no accelerations are present. Since detection of linear z-axis acceleration may be based, at least in some embodiments, on the detection of the distance between the proof mass and the substrate, these substrate deformations may limit the ability to sense such acceleration. To curb the impact of substrate deformation, in some embodiments, a reference capacitor may be used. Just like z-sensing capacitor(s) $C_{Lz}$, the reference capacitor may detect variations in the distance between the proof mass and the substrate. However, unlike z-sensing capacitor(s) $C_{Lz}$, the reference capacitors may be insensitive (or weakly sensitive) to acceleration. In this way, a measure of the substrate deformation may be obtained independently from the presence of acceleration. In one example, reference capacitors are formed between the substrate and reference beams 236, which are illustrated in FIG. 2. Reference beams 236 may be rigidly connected to fixed structures 235, and as such, may be insensitive (or weakly sensitive) to linear z-axis acceleration.

Figure 7A:
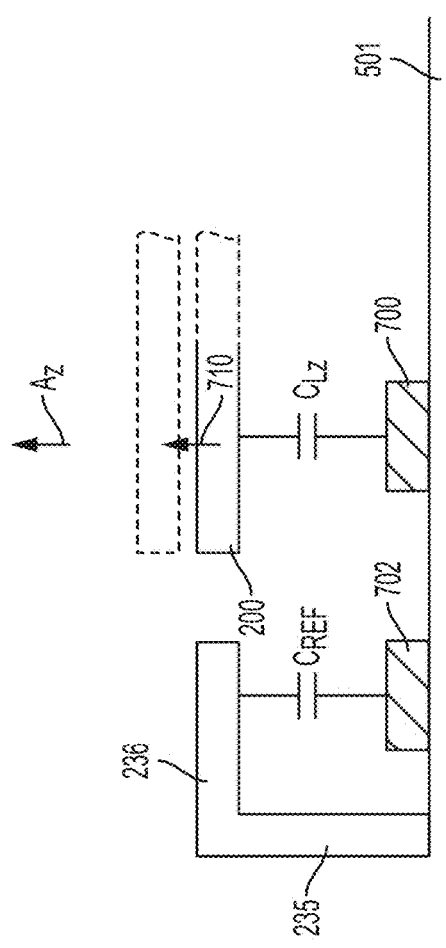
FIG. 7A is a cross sectional view taken along the AA line of FIG. 2, according to a non-limiting embodiment of the present application.

FIG. 7A is a cross sectional view of the MEMS accelerometer of FIG. 2 taken along the AA line of FIG. 2. As illustrated, a linear z-sensing capacitor $C_{Lz}$ is formed between proof mass 200 and linear z-sensing electrode 700. In addition, a reference capacitor $C_{ref}$ may be formed between reference beam 236 and reference electrode 702. Reference beam 236 may be connected to fixed structure 235 and may be cantilevered in some embodiments. In some embodiments, reference beam 236 may have a free end extending towards central portion 230.

Figure 7B:
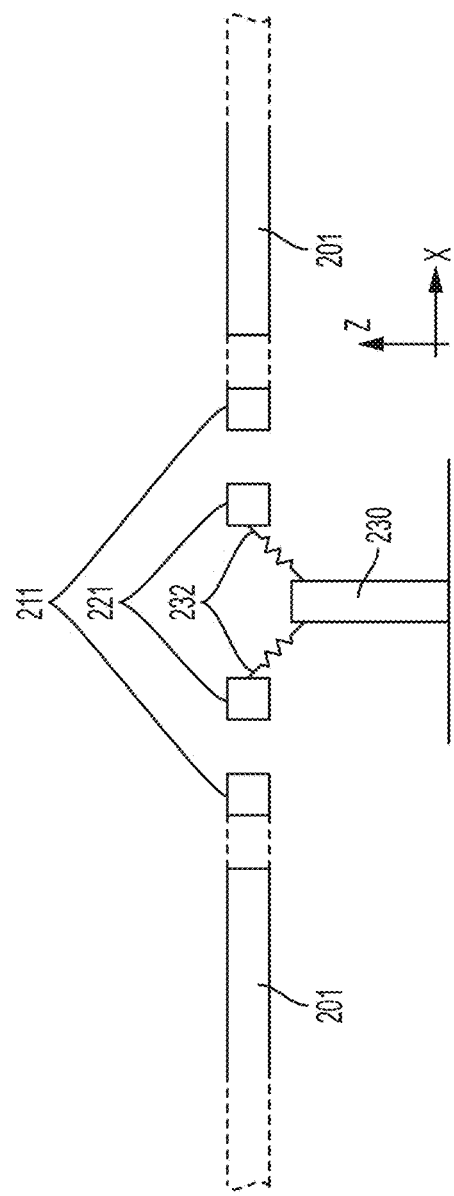
FIG. 7B is a side view of the MEMS accelerometer of FIG. 2 in the presence of a linear z-axis acceleration, according to some non-limiting embodiments.

When an acceleration $a_z$ parallel to the z-axis is applied, proof mass 200 may move, for example as shown by arrow 710. As further shown in FIG. 7B, tethers 232 may allow for out-of-plane motion of the proof mass, and may be configured to restore proof mass 200 to its natural, or resting, position when the accelerometer is no longer subjected to acceleration. While the proof mass 200 moves in the z-axis in response to acceleration, reference beam 236 remains substantially still (e.g., with a displacement that is less than 100 nm).

On the other hand, if the substrate is deformed, for example due to package stress, such deformation may be sensed by the linear z-sensing capacitor $C_{Lz}$ as well as by the reference capacitors $C_{ref}$. Being the capacitance of the reference capacitor dependent on substrate deformation and substantially independent from acceleration, in some embodiments, the reference capacitor may be used to sense the extent to which substrate 501 is deformed. The capacitance of linear z-sensing capacitor $C_{Lz}$ may reflect the magnitude of acceleration $a_z$ as well as the extent to which substrate 501 is deformed. Accordingly, the magnitude of acceleration $a_z$ may be sensed by combining the signals obtained with reference capacitor $C_{ref}$ and linear z-sensing capacitor $C_{Lz}$ in such a way to cancel (or at least limit) the impact of substrate deformation. In some embodiments, a control/sense circuit coupled to linear z-sensing capacitor $C_{Lz}$ and to reference capacitor $C_{ref}$ may be used to combine the signals. The control/sense circuit may be disposed on substrate 501 or on a separate substrate.

In some embodiments, to quantify the extent to which the capacitance of the reference capacitor and the linear z-sensing capacitor $C_{Lz}$ vary, probe signals may be applied to the capacitors. In some embodiments, the probe signals may be clock signals (e.g., periodic square waves). In some embodiments, a first clock signal may be used to charge linear z-sensing capacitor $C_{Lz}$, and a second clock signal may be used to charge reference capacitor $C_{ref}$. The clock signals may be generated using the control/sense circuit.

The first clock signal may produce an electric charge in linear z-sensing capacitor $C_{Lz}$ that depends on its capacitance and the voltage amplitude ($V_1$) of the first clock signal. For example, the charge may be given by $V_1 C_{Lz}$. Similarly, the second clock signal may produce an electric charge in reference capacitor $C_{ref}$ that depends on its capacitance and the voltage amplitude ($V_2$) of the second clock signal. For example, the charge may be given by $V_2 C_{ref}$.

In some embodiments, to decouple detection of z-axis acceleration from substrate stress the amounts of electric charge generated by the capacitors in response to substrate deformation may be configured to be substantially equal in amplitude and opposite in sign relative to one another. Opposite signs may be obtained, at least in some embodiments, by setting the first and second clock signals to be out-of-phase (e.g., by 180 degrees) relative to one another. Equal amounts of charge may be ensured by setting $V_1$, $V_2$, $C_{ref}$ and $C_{Lz}$ according to the following relationship: $V_1 C_{Lz} - V_2 C_{ref} = 0$.

Figure 8B:
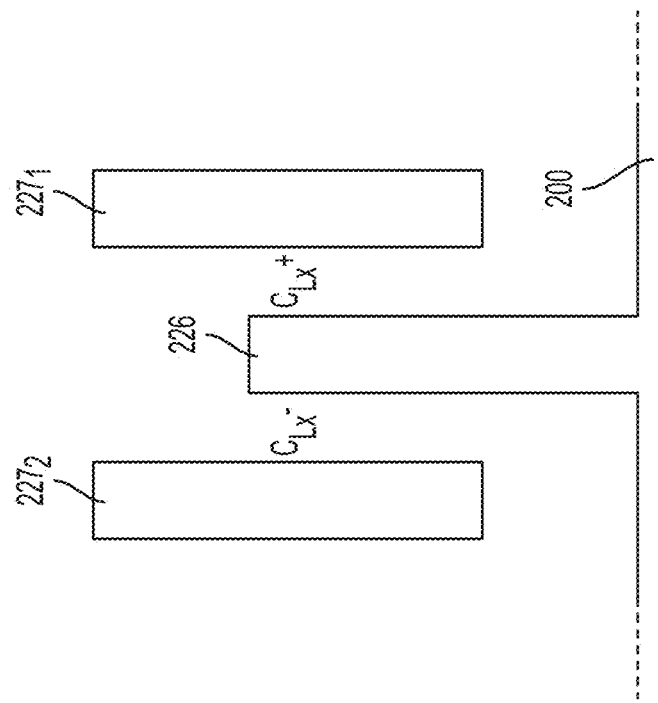
FIG. 8B is a top view of a linear x-sensing element, according to a non-limiting embodiment of the present application.
Figure 8A:
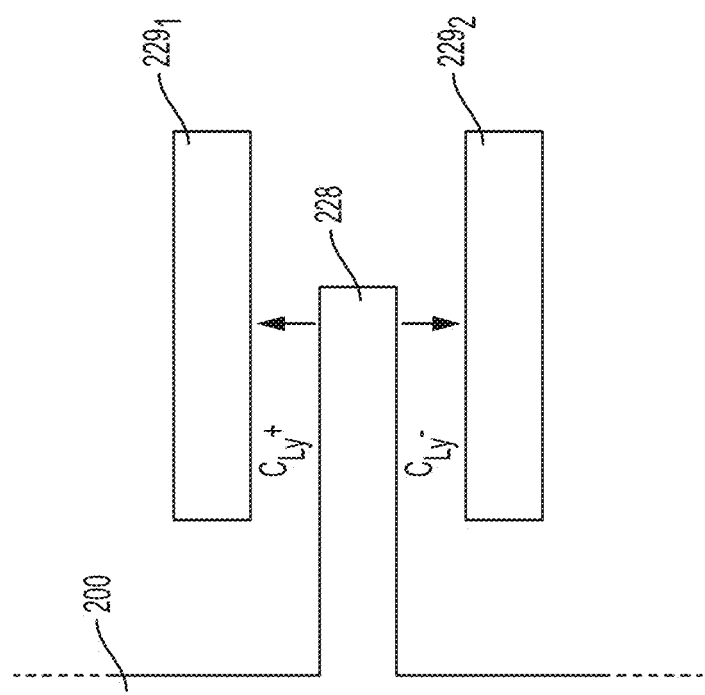
FIG. 8A is a top view of a linear y-sensing element, according to a non-limiting embodiment of the present application.

Linear acceleration in the x-axis may be sensed using linear x-sensing beams 226 and linear acceleration in the y-axis may be sensed using linear y-sensing beams 228. As illustrated in FIG. 2, linear x-sensing 226 and y-sensing beams 228 may be connected to the outer edge 202 of proof mass 200. For example, one end of the linear x-sensing and y-sensing beams may be connected to the proof mass, and the other end may be free. As such, the linear x-sensing and y-sensing beams may generally point in a direction away from the center of proof mass 200. It should be appreciated that the linear x-sensing and y-sensing beams need not be connected to outer edge 202, as other configurations are also possible. The linear x-sensing and y-sensing beams may form sense capacitors with fixed beams, as illustrated in additional detail in FIGS. 8A and 8B. For example, linear y-sensing beam 228 may form linear y-sensing capacitors $C_{Ly}^+$ and $C_{Ly}^-$ with fixed electrodes $229_1$ and $229_2$, respectively (see FIG. 8A). Linear x-sensing beam 226 may form linear x-sensing capacitors $C_{Lx}^+$ and $C_{Lx}^-$ with fixed electrodes $227_1$ and $227_2$, respectively (see FIG. 8B). The linear sensing beams may be arranged such that when their distance relative to a fixed electrode is decreased in response to an acceleration, their distance relative to the opposite fixed electrode is increased. In this way, differential signals may be generated in response to acceleration.

In the configuration depicted in FIG. 2, one set of tethers may be used to enable motion of the MEMS accelerometer in response to linear and angular acceleration. As illustrated in FIG. 2, tethers 232 are used to allow linear displacement as well as angular displacement of the proof mass. However, in some embodiments, the manner in which these tethers are positioned and shaped may be optimized to favor angular motion while sacrificing response of the proof mass to linear acceleration (or vice versa). That is, the design of the tethers may be dictated by trade-off considerations between achieving large response to linear acceleration and large response to angular acceleration. For example, in some circumstances, response to angular acceleration may be enhanced by including a single anchor attached to the center of central portion 230 through a set of tethers. In this way, immunity to stress in the substrate may be improved. On the other hand, response to linear acceleration may be enhanced by including a plurality of anchors positioned away from the center of central portion 230 and tethers connecting the anchors to the proof mass. In this way, crosstalk caused by angular acceleration may be mitigated.

In other embodiments, however, separate sets of tethers may be used. For example, a first set of tethers may enable motion of a MEMS accelerometer in response to linear acceleration and another set of tethers may enable motion of the MEMS accelerometer in response to angular acceleration. In this way, the sets of tethers may be designed and/or arranged independently, and the accelerometer's response to linear and angular acceleration may be engineered independently from one another.

Figure 9:
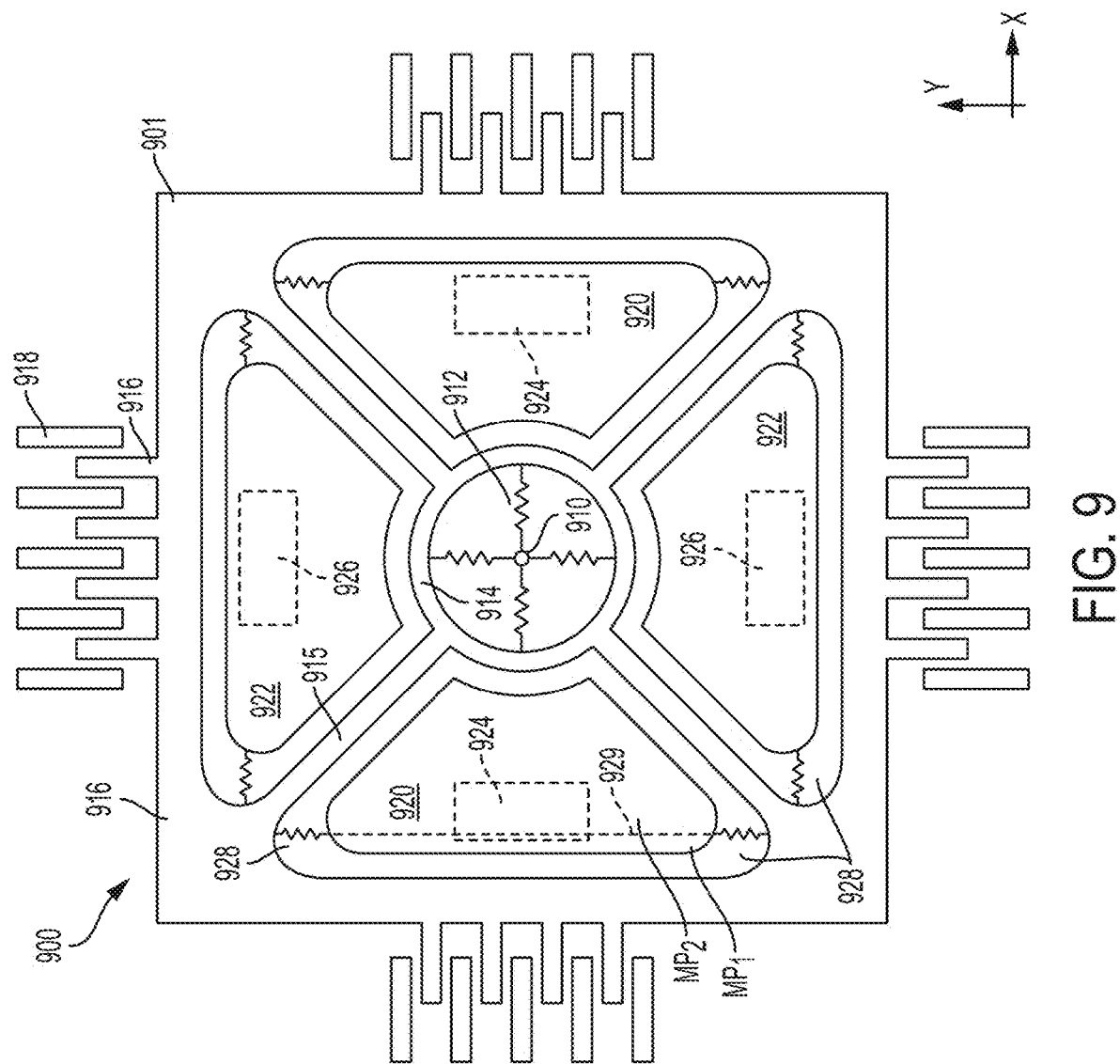
FIG. 9 illustrates schematically a representative MEMS accelerometer having proof mass and a plurality of shuttle masses, according to some non-limiting embodiments.

One representative configuration for detecting linear and angular acceleration leveraging separate sets of tethers is illustrated in FIG. 9. MEMS accelerometer 900 may comprise a proof mass 901, shuttle masses 920 and 922, tethers 928 and tethers 912. MEMS accelerometer 900 may be configured to sense linear acceleration along one, two or three axes and/or angular acceleration about one, two or three axes. Tethers 928 may be used to enable motion of the MEMS accelerometer in response to linear acceleration and tethers 912 may be used to enable motion of the MEMS accelerometer in response to angular acceleration. Proof mass 901 and shuttle masses 920 and 922 may be suspended above an underlying substrate.

The tethers 912 may elastically couple proof mass 901 to an anchor 910. Tethers 912 may be arranged according to the configuration of FIG. 6A or 6B, or in any other suitable manner. In some embodiments, a plurality of anchors may be used to connect proof mass 901 to the substrate. The plurality of anchors may be arranged, for example, as described in connection with FIG. 5D.

Proof mass 901 and shuttle masses 920 and 922 may be made of (at least in part) a conductive material, such as silicon, doped silicon, polysilicon or doped polysilicon. The silicon and/or polysilicon may be n-doped and/or p-doped with a doping concentration between $10^{16}$ cm$^{-3}$ and $5 \times 10^{20}$ cm$^{-3}$ in some embodiments, between $10^{18}$ cm 3 and $10^{20}$ cm$^{-3}$ in some embodiments, between $5 \times 10^{18}$ cm$^{-3}$ and $5 \times 10^{19}$ cm$^{-3}$ in some embodiments, or between any suitable values or range of values. Other values are also possible. In alternative, other conductive materials can be used.

In some embodiments, proof mass 901 may comprise an inner portion 914 and on outer portion 916. The inner portion 914 and the outer portion 916 may be connected to one another via beams 915. Inner portion 914 may be coupled to anchor 910 via tethers 912, and outer portion 916 may enclose, at least in some embodiments, inner portion 914 therein.

Shuttle masses 920 and 922 may be disposed, in some embodiments, between inner portion 914 and outer portion 916. In some embodiments, a shuttle mass may be disposed between adjacent beams 915. Shuttle masses 920 and 922 may be elastically coupled to the proof mass 901 via tethers 928. The tethers may couple respective shuttle masses to beams 915 or outer portion 916. Shuttle masses 920 and 922 may be configured to sense linear acceleration, as will be described further below. To this end, shuttle masses 920 may comprise sensor 924 and shuttle masses 922 may comprise sensor 926.

Tethers 928 may define an axis of rotation for a shuttle mass. For example, one of the shuttle masses 920 is illustrated as having a rotation axis 929. The rotation axis may be configured to divide a respective shuttle mass into a pair of mass portions $MP_1$ and $MP_2$. Mass portion $MP_1$ may define one side of a shuttle mass with respect to the rotation axis. Mass portion $MP_2$ may define the opposite side. In some embodiments, mass portions $MP_1$ and $MP_2$ may have different weights relative to one another. In this way, when MEMS accelerometer 900 experiences a linear acceleration along the z-axis, the shuttle masses may rotate out-of-plane about the corresponding rotation axis 929, since the shuttle mass' center of gravity is offset from the rotation axis.

Figure 10A:
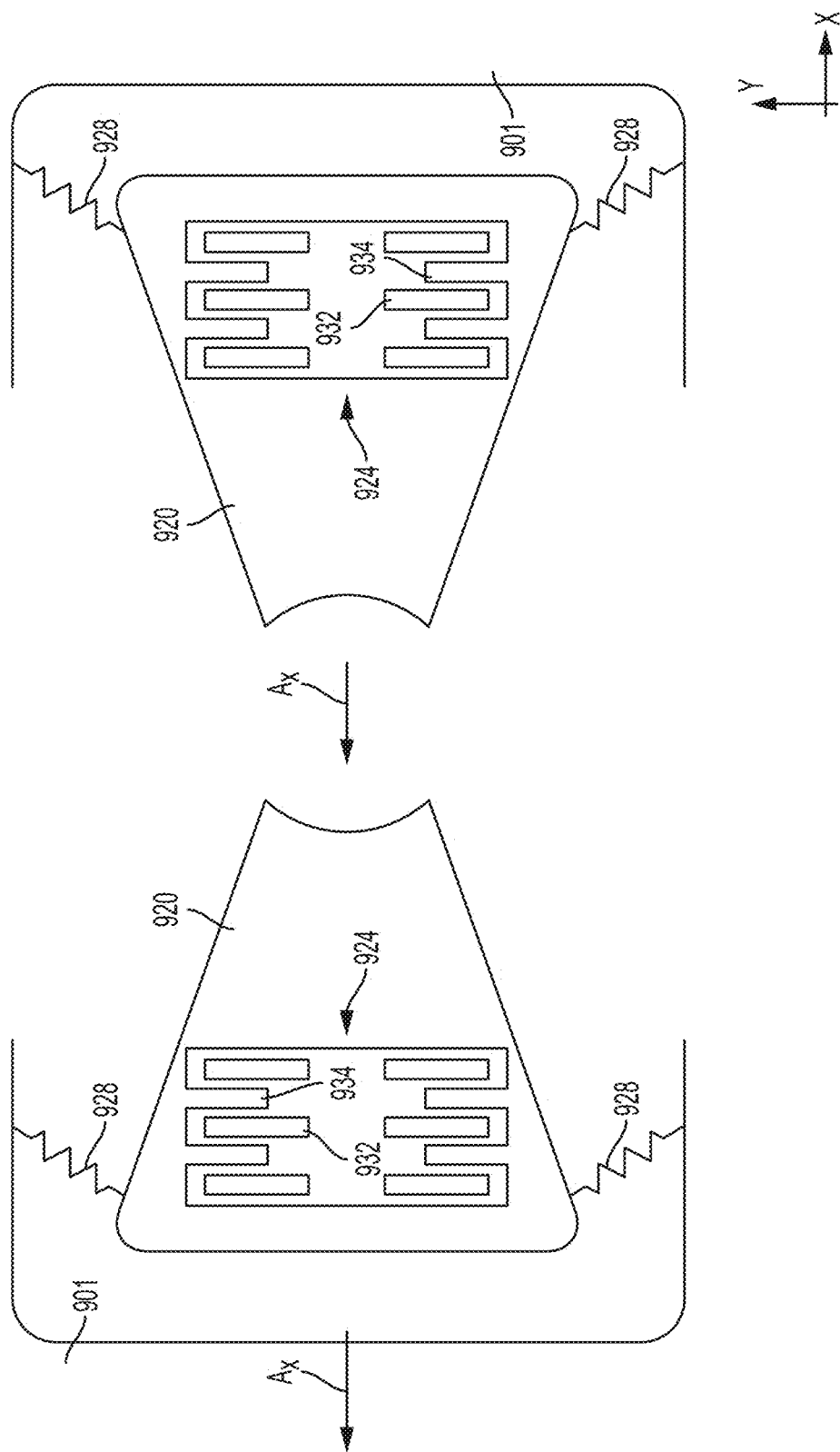
FIG. 10A is a top view illustrating a portion of the MEMS accelerometer of FIG. 9 in the presence of a linear x-axis acceleration, according to some non-limiting embodiments.

First, detection of linear x-axis acceleration is discussed. Linear x-axis acceleration may be sensed, at least in some embodiments, by sensing motion of shuttle masses 920 in the x-axis relative to the substrate. One representative arrangement for sensing linear x-axis acceleration in this manner is illustrated in FIG. 10A. For clarity, only shuttle masses 920 and a portion of proof mass 901 are illustrated in FIG. 10A. In the presence of an acceleration $a_x$ directed along the x-axis, shuttle masses 920 may move relative to the substrate. In some embodiments, the weight of a shuttle mass 920 is less than the weights of proof mass 901. In this way, the conservation of momentum may cause the shuttle mass to move relative to the proof mass. Motion of the shuttle masses relative to the proof mass may be enabled by the presence of tethers 928, which may flex relative to their natural position.

Motion of the shuttle masses relative to the substrate may be sensed using sensor 924, which in the non-limiting example of FIG. 10A comprises fingers 934 and fixed electrodes 932. The fixed electrodes 932 may be anchored to the substrate, and as such may remain still in the presence of x-axis acceleration. The fingers 934 and the fixed electrode 932 may form a plurality of sense capacitors. Motion of the shuttle mass 920 may be sensed may detecting variations in the capacitance of such capacitors.

Figure 10B:
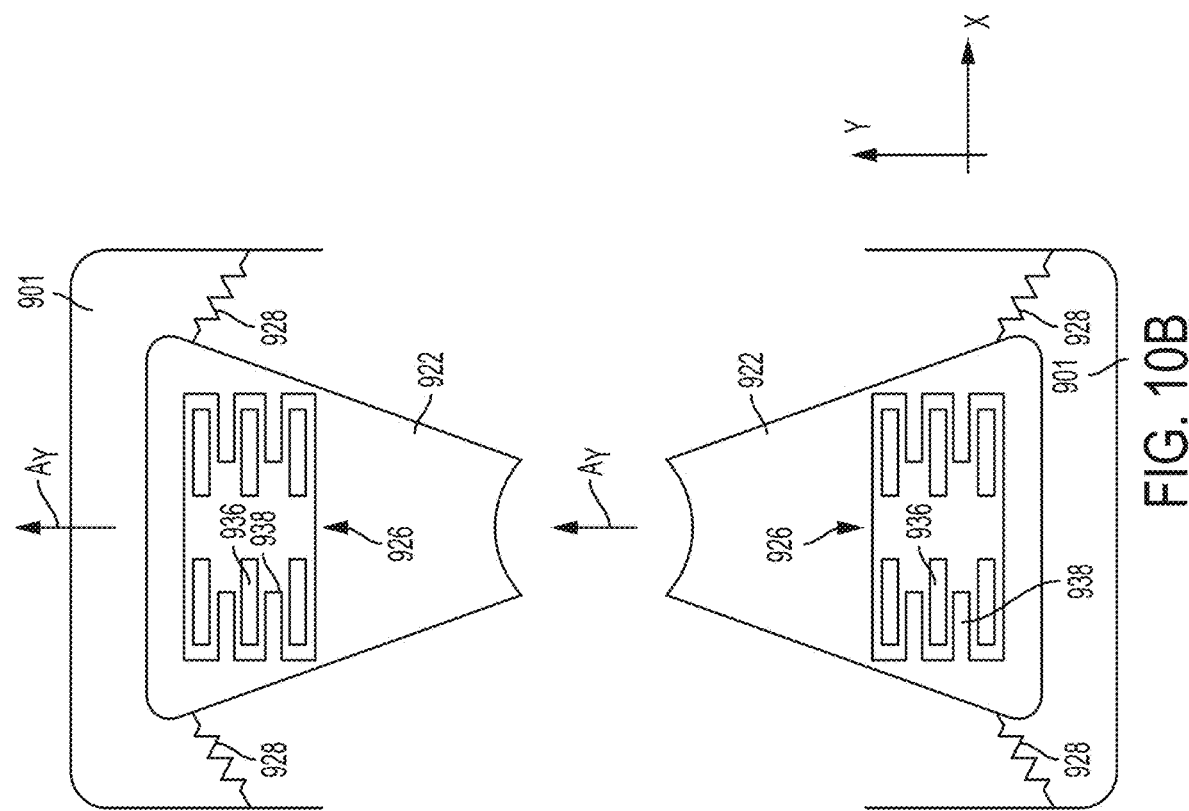
FIG. 10B is a top view illustrating a portion of the MEMS accelerometer of FIG. 9 in the presence of a linear y-axis acceleration, according to some non-limiting embodiments.

Detection of linear y-axis acceleration $a_y$ may be performed in a similar fashion, as illustrated in FIG. 10B. In this example, shuttle masses 922, which in some embodiments are heavier than proof mass 901, may move along the y-axis relative to the substrate. Motion of the shuttle masses 922 may be sensed may detecting variations in the capacitance of the capacitors formed by fingers 938 and fixed electrodes 936.

Figure 11:
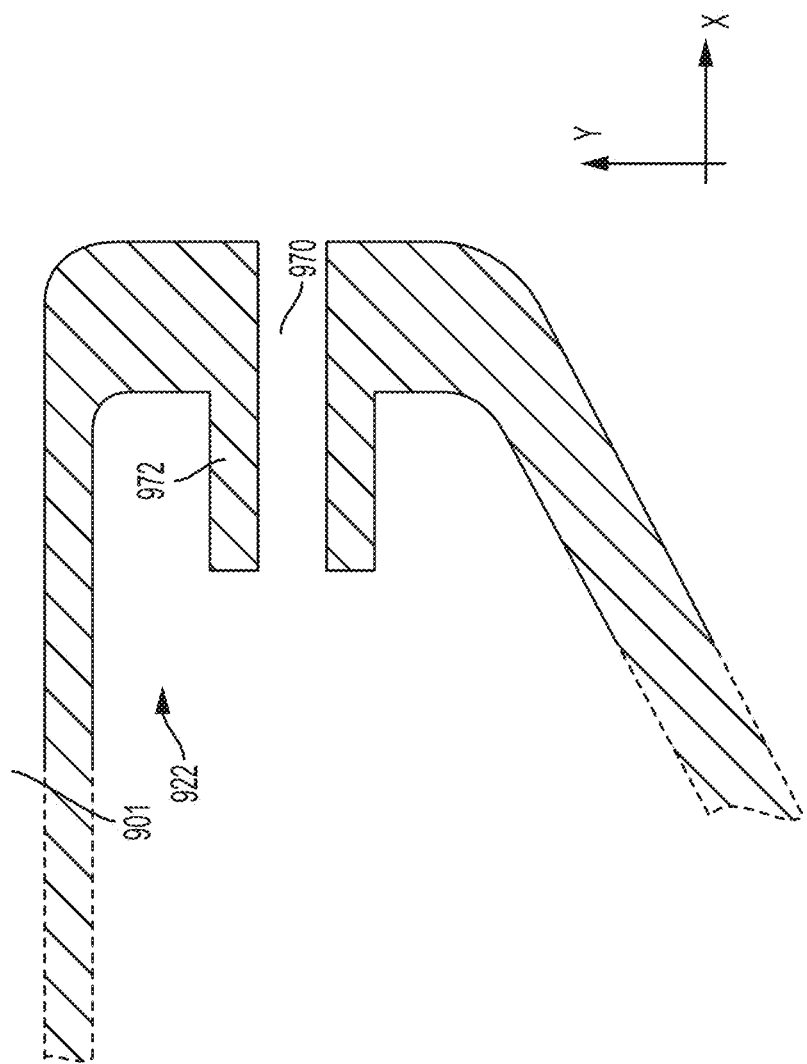
FIG. 11 illustrates a tether for elastically coupling a shuttle mass to a proof mass of a MEMS accelerometer, according to some non-limiting embodiments.

Tethers 928 may be implemented in any of numerous ways. For example, a tether 928 may comprise one or more beams configured to torque and/or flex in response to acceleration. One possible implementation of a tether 928 is shown in FIG. 11. As illustrated, tether 928 may comprise a beam 970 connecting proof mass 901 to shuttle mass 922. Shuttle mass 922 may comprise a recess 972 and one end of beam 970 may be connected to a portion of the shuttle mass that is within the recess. Beam 970 may flex to enable motion of the shuttle mass along the y-axis and/or may torque to enable rotation of the shuttle mass about the x-axis.

Figure 12:
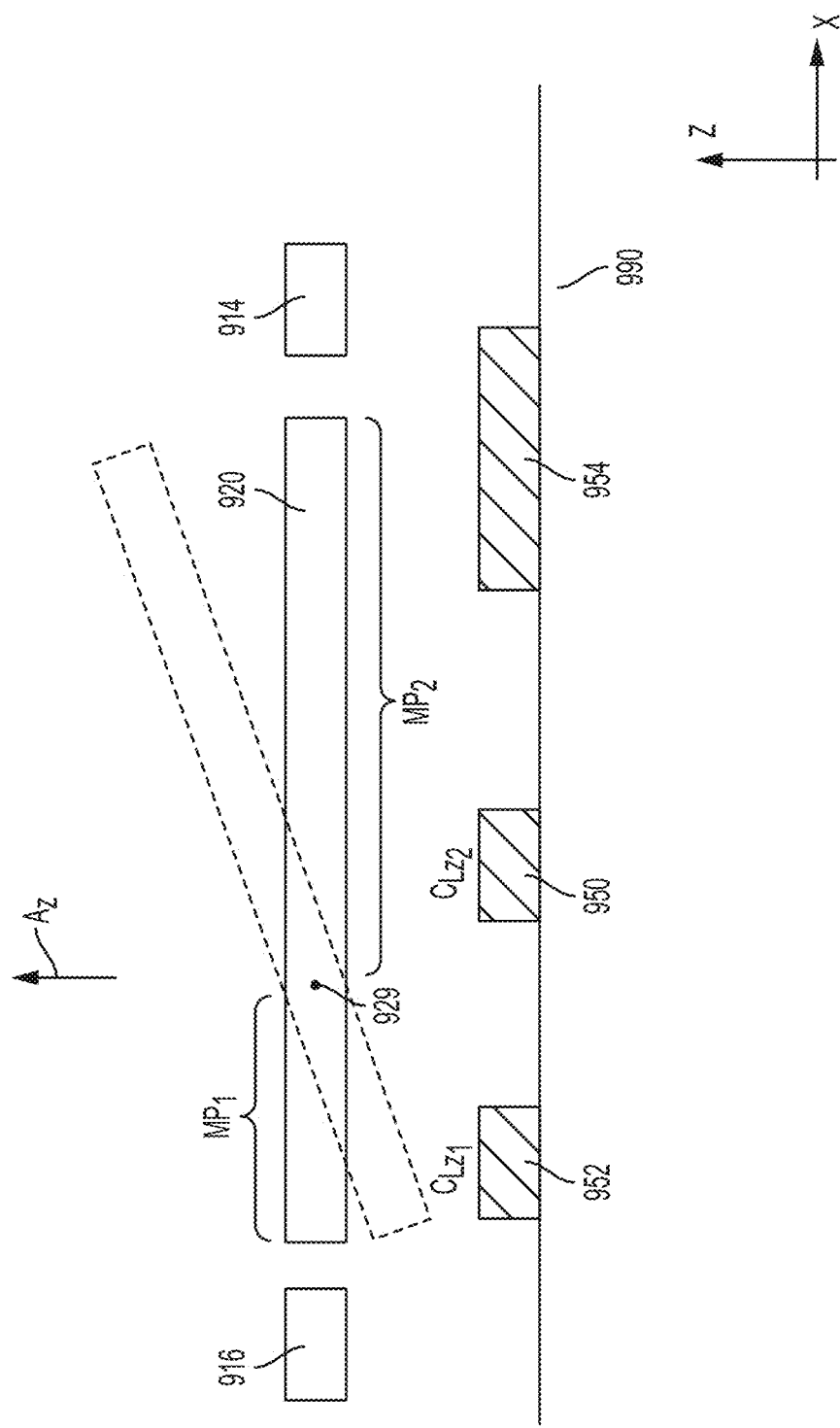
FIG. 12 is a side view of a portion of the MEMS accelerometer of FIG. 9 illustrating a linear z-sensing element, according to some non-limiting embodiments.

Detection of linear z-axis acceleration may be performed by sensing rotations of the shuttle masses, as illustrated in FIG. 12. FIG. 12, a cross sectional view of MEMS accelerometer 900 in the xz-plane, illustrates a portion of proof mass 901 including outer portion 916 and inner portion 914, and a shuttle mass 920. As illustrated, rotation axis 929 separates shuttle mass 920 into mass portion $MP_1$ and $MP_2$. In this configuration mass portion $MP_2$ is heavier than mass portion $MP_1$ (having $MP_2$ a greater surface relative to $MP_2$), though the opposite arrangement is also possible. In the embodiments in which the mass portions have different weights, the center of gravity of the shuttle mass is offset relative to rotation axis 929. As a result, when an acceleration $a_z$ is applied, the shuttle mass may rotate about the rotation axis 929. This rotation may cause mass portion MP1 to move closer to the substrate 990 and mass portion $MP_2$ to move away from substrate 990, or vice versa.

Rotation of the shuttle mass may be sensed by sensing the variation in the distance between the mass portions and the substrate. This may be accomplished, at least in some embodiments, by forming capacitors between the shuttle masses and electrodes disposed on the substrate. For example, a capacitor $C_{LZ1}$ may be formed between mass portion MP$_1$ (which may serve as a first electrode) and electrode 952. Similarly, a capacitor C$_{LZ2}$ may be formed between mass portion MP$_2$ and electrode 950. Capacitors C$_{LZ1}$ and C$_{LZ2}$ may be configured to sense linear z-axis acceleration in a differential fashion. In fact, when the capacitance of one of these capacitors increases, the capacitance of the other capacitors may decrease. Being differentially arranged, the signals generated by the capacitors may be insensitive to common mode signals (such as signals generated owing to substrate deformations).

FIG. 12 further illustrates electrode 954, which may be used to sense angular acceleration, as will be described further below. In some embodiments, electrode 954 is closer to anchor 910 relative to electrode 950 and/or electrode 952.

Figure 13:
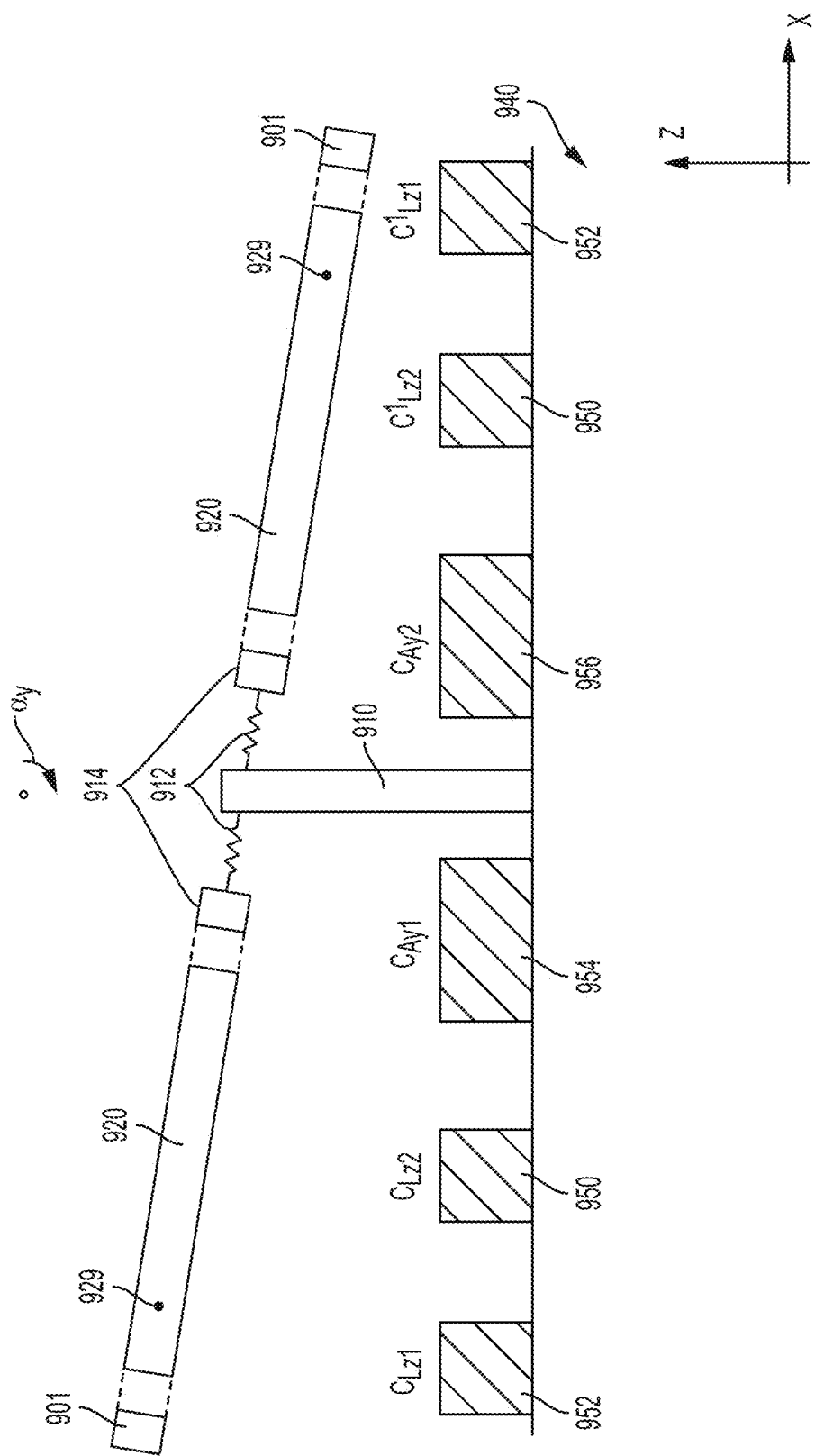
FIG. 13 is a side view of a portion of the MEMS accelerometer of FIG. 9 illustrating an angular y-sensing element, according to some non-limiting embodiments.

In some embodiments, detection of angular acceleration about the x-axis and/or the y-axis may be sensed by sensing out-of-plane motion of proof mass 901. For example, detection of angular acceleration about the y-axis is illustrated in FIG. 13. It should appreciated that detection of angular acceleration about the x-axis may be performed in a similar fashion. In the presence of an angular acceleration about the y-axis, proof mass 901 may rotate such that one side moves closer to the substrate 990 and the opposite side moves away from it (as shown in FIG. 13). Rotation of the proof mass may be enabled by the presence of tethers 912. Being elastic, tethers 912 may restore the proof mass to its natural, or resting, position when the MEMS accelerometer is no longer subjected to the angular acceleration.

Such angular acceleration may be sensed using capacitors C$_{ay1}$ and C$_{ay2}$. Capacitor C$_{ay1}$ may be formed between electrode 954 and shuttle mass 920 and/or inner portion 914. Similarly, capacitors C$_{ay2}$ may be formed between electrode 956 and shuttle mass 920 and/or inner portion 914. As illustrated, differential signals may be generated in response to angular y-axis acceleration by virtue of the fact that when the capacitance of capacitor C$_{ay1}$ increases, the capacitance of capacitor C$_{ay2}$ decreases (or vice versa).

It should be appreciated that, in some embodiments, the shuttle masses 920 may rotate about the respective rotation axes 929 due to angular acceleration about the y-axis. However, these rotations may be rejected as common mode signals. For example, the signals produced by capacitors C$_{Lz1}$, C$_{Lz2}$, C$_{Lz1}$, and C$_{Lz2}$ in response to angular acceleration may be combined to cancel each other out and to output a non-zero value in response to linear z-axis acceleration.

Figure 14:
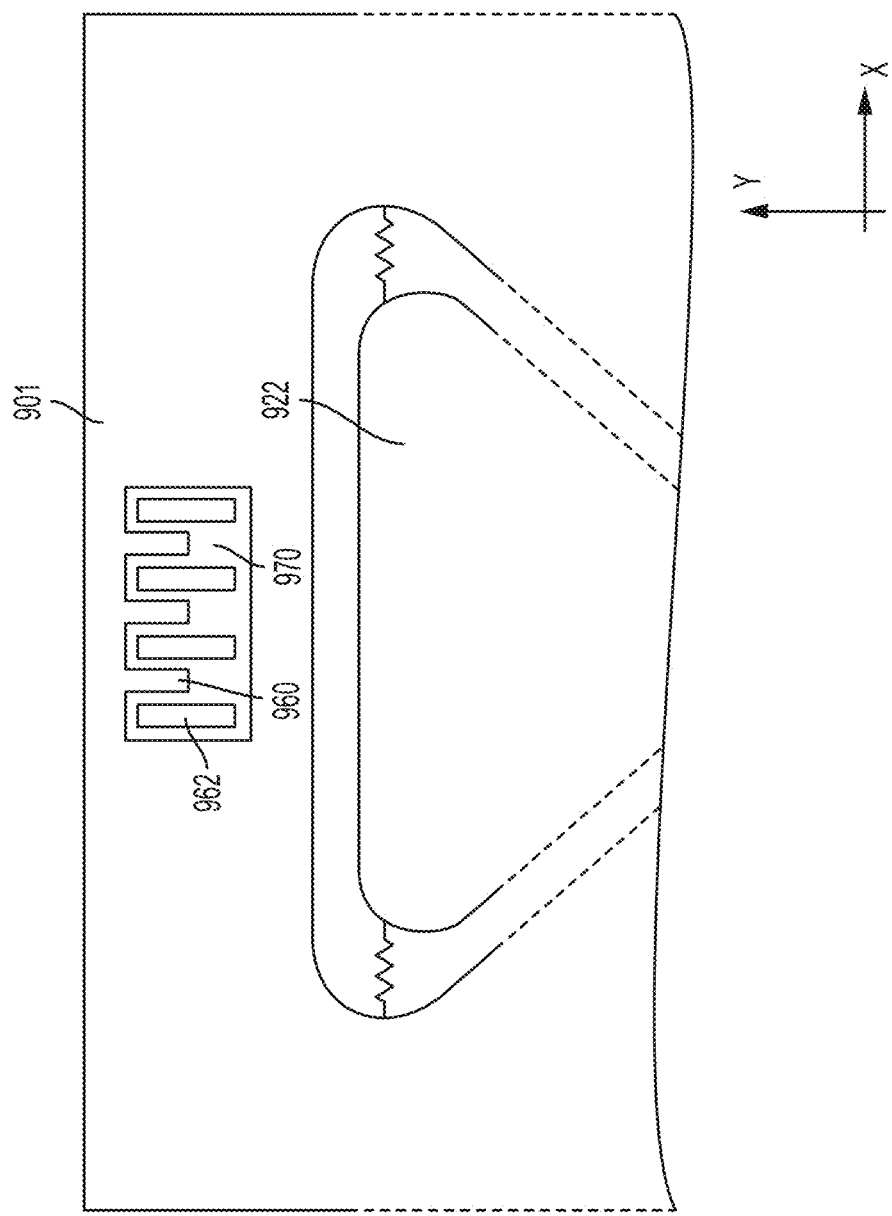
FIG. 14 is a top view of a portion of the MEMS accelerometer of FIG. 9 illustrating an angular z-sensing element, according to some non-limiting embodiments.

Angular acceleration about the z-axis may be sensed using capacitors formed between fingers 916 and fixed electrodes 918. Referring back to FIG. 9, fingers 916 may have one end connected to an outer edge of proof mass 901 and a free end. The free end may point in a direction generally away from anchor 910. Fixed electrodes 918 may be anchored to the substrate. In other embodiments, the fingers may generally point towards anchor 910, as illustrated in the non-limiting example of FIG. 14. In this arrangement, fingers 960 are formed within an opening 970 in proof mass 901. Corresponding fixed electrodes 962 may be disposed adjacent to the fingers 960. Variations in the capacitance of the capacitors formed between fingers 960 and fixed electrodes 962 may provide an indication of the angular z-axis acceleration experienced by the MEMS accelerometer.

MEMS accelerometers of the types described herein may form part of various systems with applications in a variety of fields, such as in sports, military, healthcare, and industrial settings (e.g., machine health monitoring), among others. The various systems may form part of, or be used, in an Internet of Things network. Examples of such systems and applications are now described.

Figure 15:
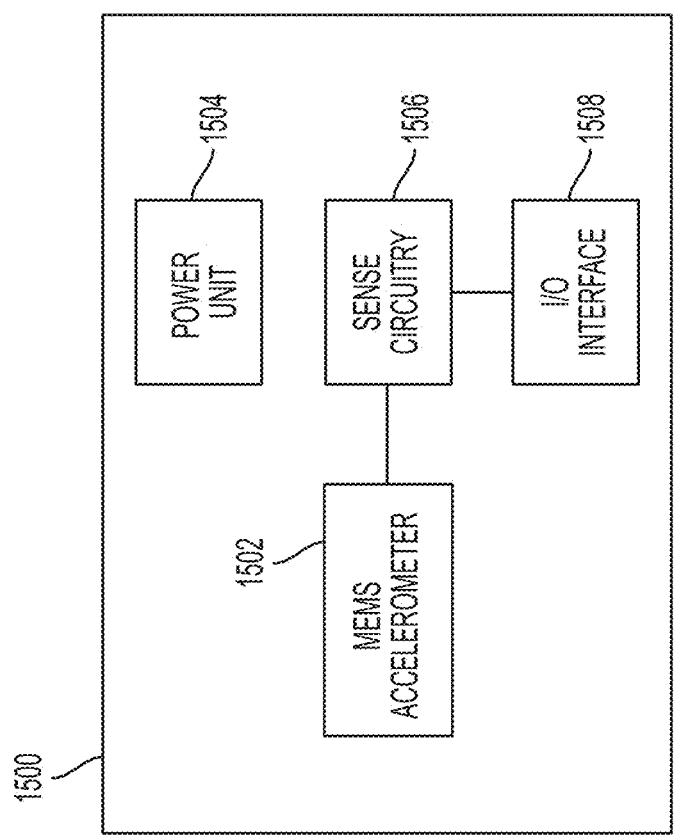
FIG. 15 is a block diagram of a system incorporating angular accelerometers of the types described herein, according to some non-limiting embodiments.

FIG. 15 is a block diagram illustrating a system 1500, which may be configured as a 2-axis inertial sensor, 3-axis inertial sensor, 4-axis inertial sensor, 5-axis inertial sensor and/or 6-axis inertial sensor. System 1500 may comprise a MEMS accelerometer 1502, a power unit 1504, sense circuitry 1506 and input/output (I/O) interface 1508. MEMS accelerometer 1502 may be implemented as any one of the MEMS accelerometers described above. In some embodiments, sense circuitry 1506 and MEMS accelerometer 1502 may be disposed on the same substrate, such as a silicon substrate. In other embodiments, sense circuitry 1506 and MEMS accelerometer 1502 may be disposed on separate substrates, which may be bonded to one another and/or packaged within a common housing.

Sense circuitry 1506 may be configured to sense acceleration (linear and/or angular) for example by mapping capacitance variations to magnitude of acceleration. Sense circuitry 1506 may comprise an amplifier, an analog-to-digital converter, a memory, a processor, an application-specific integrated circuit (ASIC) or other analog and/or digital circuits.

System 1500 may periodically transmit, via wired connections or wirelessly, signal that are indicative of sensed angular and/or linear acceleration to an external monitoring system, such as a computer, a smartphone, a tablet, a smartwatch, smartglasses, or any other suitable receiving device. I/O interface 1508 may be configured to transmit and/or receive data via Wi-Fi, Bluetooth, Bluetooth Low Energy (BLE), Zigbee, Thread, ANT, ANT+, IEEE 802.15.4, IEEE 802.11.ah, or any other suitable wireless communication protocol. Alternatively, or additionally, I/O interface 1508 may be configured to transmit and/or receive data using proprietary connectivity protocols. I/O interface 1508 may comprise one or more antennas, such as a microstrip antenna. In some embodiments, I/O interface 1508 may be connected to a cable, and may be configured to transmit and/or receive signals through the cable.

System 1500 may be powered using power unit 1504. Power unit 1504 may be configured to power sense circuitry 1506, I/O interface 1508, and/or MEMS accelerometer 1502. In some embodiments, power unit 1504 may comprise one or more batteries. System 1500 may, in at least some embodiments, consume sufficiently little power to allow for its operation for extended periods based solely on battery power. The battery or batteries may be rechargeable in some embodiments. Power unit 1504 may comprise one or more lithium-ion batteries, lithium polymer (LiPo) batteries, super-capacitor-based batteries, alkaline batteries, aluminum-ion batteries, mercury batteries, dry-cell batteries, zinc-carbon batteries, nickel-cadmium batteries, graphene batteries or any other suitable type of battery. In some embodiments, power unit 1504 may comprise circuitry to convert AC power to DC power. For example, power unit 1504 may receive AC power from a power source external to system 1500, such as via I/O interface 1508, and may provide DC power to some or all the components of system 1500. In such instances, power unit 1504 may comprise a rectifier, a voltage regulator, a DC-DC converter, or any other suitable apparatus for power conversion.

Power unit 1504 may comprise energy harvesting components and/or energy storage components, in some embodiments. Energy may be harvested from the surrounding environment and stored for powering the system 1500 when needed, which may include periodic, random, or continuous powering. The type of energy harvesting components implemented may be selected based on the anticipated environment of the system 1500, for example based on the expected magnitude and frequency of motion the system 1500 is likely to experience, the amount of stress the system is likely to experience, the amount of light exposure the system is likely to experience, and/or the temperature(s) to which the system is likely to be exposed, among other possible considerations. Examples of suitable energy harvesting technologies include thermoelectric energy harvesting, magnetic vibrational harvesting, electrical overstress harvesting, photovoltaic harvesting, radio frequency harvesting, and kinetic energy harvesting. The energy storage components may comprise supercapacitors in some embodiments.

System 1500 may be deployed in various settings to detect linear and/or angular acceleration, including sports, healthcare, military, and industrial applications, among others. Some non-limiting examples are now described. A system 1500 may be a wearable sensor deployed in monitoring sports-related physical activity and performance, patient health, military personnel activity, or other applications of interest of a user.

Figure 16:
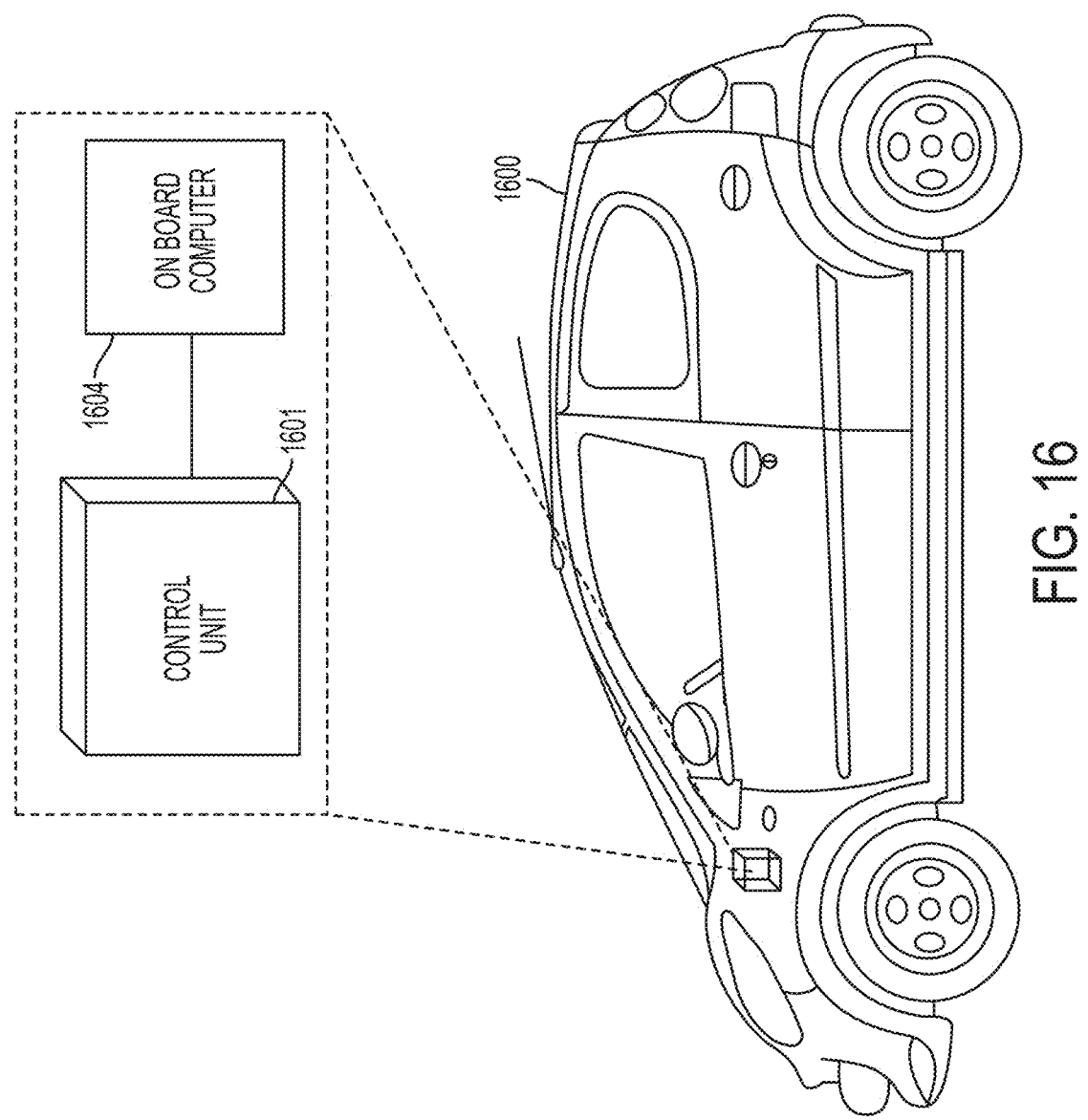
FIG. 16 illustrates schematically an automobile including the system of FIG. 15, according to some non-limiting embodiments.

One such setting is in automobiles, or other vehicles, such as boats and aircraft. FIG. 16 illustrates an example, in which a sensor system of the types described herein is employed in a car. In the example of FIG. 16, an automobile 1600 includes a control unit 1601 coupled to an onboard computer 1604 of the car by a wired or wireless connection. Control unit 1601 may comprise system 1500 of FIG. 15. System 1500 may comprise a package or housing attached to a suitable part of the automobile 1600. The MEMS accelerometer of system 1500 may, as an example, sense acceleration along the driving direction and/or perpendicular the driving direction. Additionally, or alternatively, the MEMS accelerometer may be configured to sense vertical acceleration, thus monitoring, for example, the status of the suspensions. Additionally, or alternatively, the MEMS accelerometer may be configured to sense angular acceleration (e.g., roll, pitch and/or yaw) to monitor, for example, the stability of the car. Control unit 1601 may receive power and control signals from the onboard computer 1604, which may output information to the driver that is indicative of linear and/or angular acceleration.

Figure 17:
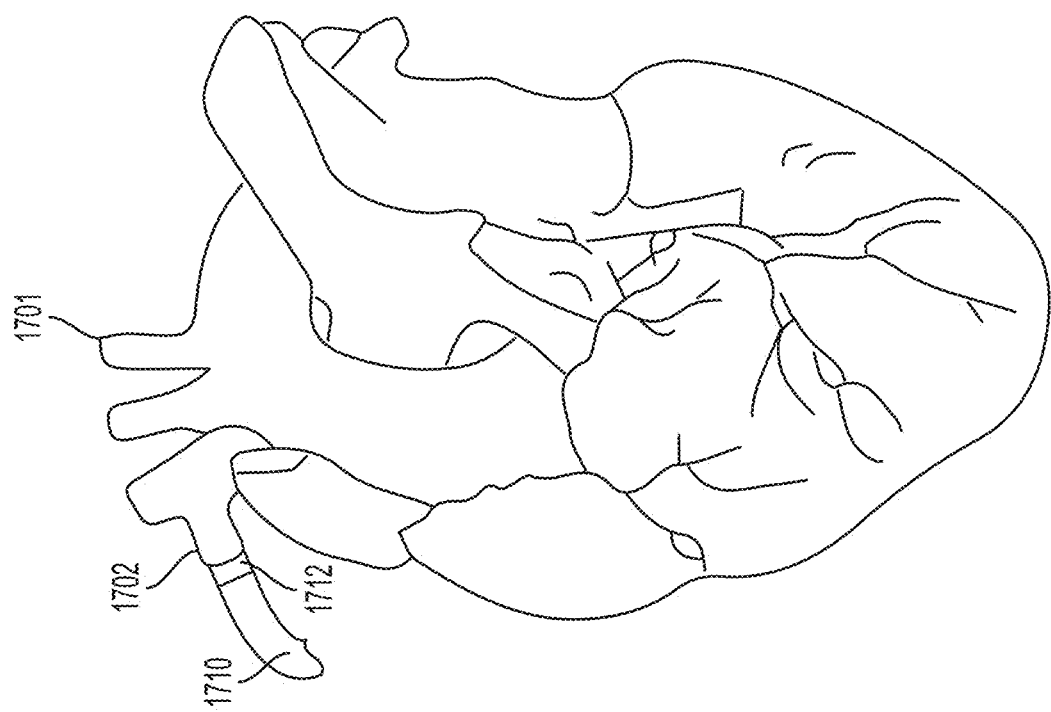
FIG. 17 illustrates a catheter comprising a system configured to measure angular and linear acceleration, according to some non-limiting embodiments

As another example, system 1500 may be used in catheters. The system 1500 may be disposed near an end of the catheter. As the catheter is inserted or removed from a subject, angular and linear acceleration may be detected by the MEMS accelerometer 1502. This information may provide an indication of the amount of force being used, and whether damage to the patient is going to result, as an example. The sense circuitry 1506 may provide the detected acceleration out of the catheter via I/O interface 1508. FIG. 17 illustrates a catheter 1710 for use in connection with a patient's heart 1701. Catheter 1710 may comprise a device 1712, which may comprise system 1500. In some embodiments, device 1712 may be disposed at one end of catheter 1710. In some embodiments, catheter 1710 may be placed in contact with heart 1701, and may be configured to sense heart motion and/or heart rate, using angular MEMS accelerometer 1502. In some embodiments, catheter 1710 may be inserted in a vessel leading to heart 1701, such as vessel 1702. While FIG. 17 illustrates a catheter 1710 for use in connection with a heart, motions of any other suitable organ may be sensed using catheter 1710.

Aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

Aspects of the present application provide MEMS accelerometers configured to sense linear and angular accelerometers using a single device. Compared to conventional devices, the MEMS accelerometers of the type described herein may be more compact, thus reducing the real estate need on a substrate. Additionally, the MEMS accelerometers of the types described herein may allow for a reduction in the fabrication costs, since fabrication steps may be shared between the linear sensing elements and the angular sensing elements.

What is claimed is:

1. An angular and linear accelerometer comprising:
at least one anchor connected to a substrate;
a proof mass coupled to the at least one anchor via a plurality of tethers, wherein a tether of the plurality of tethers is symmetric with respect to a plane that passes through a center of the proof mass and is substantially perpendicular to the substrate;
a first capacitor configured to generate a first sense signal in response to rotational motion of the proof mass;
a second capacitor configured to generate a second sense signal in response to linear motion of the proof mass; and
a reference capacitor formed from an electrode disposed on the substrate and a beam rigidly connected to the substrate, the reference capacitor being configured to generate a reference signal.

2. The angular and linear accelerometer of claim 1, wherein the first capacitor comprises a fixed electrode connected to the substrate and a free-end beam coupled to the proof mass.

3. The angular and linear accelerometer of claim 2, wherein the proof mass comprises a mass portion having an outer edge and an inner edge, and wherein the free-end beam has a fixed end proximate the inner edge and a free end proximate the center of the proof mass.

4. The angular and linear accelerometer of claim 3, wherein the fixed electrode is a first fixed electrode and the free-end beam is a first free-end beam, and wherein the second capacitor comprises a second fixed electrode connected to the substrate and a second free-end beam coupled to the proof mass.

5. The angular and linear accelerometer of claim 4, wherein the second free-end beam has a fixed end and a free end, the fixed end of the second free-end beam being closer than the free end of the second free-end beam relative to the center of the proof mass.

6. The angular and linear accelerometer of claim 1, wherein the second capacitor is configured to generate a sense signal in response to out-of-plane motion of the proof mass, and
wherein the second capacitor is formed from a second electrode disposed on the substrate and a portion of the proof mass.

7. The angular and linear accelerometer of claim 6, further comprising circuitry configured to determine out-of-plane acceleration of the angular and linear accelerometer based on the sense signal and the reference signal.

8. The angular and linear accelerometer of claim 1, wherein the electrode is a first electrode, and wherein the first capacitor is configured to sense out-of-plane motion of the proof mass in response to an angular acceleration, and wherein the first capacitor is formed from a second electrode disposed on the substrate and a portion of the proof mass.

9. A method for sensing angular and linear acceleration, the method comprising:
   sensing rotational motion of a proof mass connected to a substrate via at least one anchor by generating, through a first sense capacitor, a first sense signal in response to angular acceleration about a first rotational axis, wherein the proof mass is connected to the at least one anchor by at least one tether that is symmetric with respect to a plane that passes through a center of the proof mass and is substantially perpendicular to the substrate, and
   sensing linear motion of the proof mass, wherein sensing linear motion of the proof mass comprises:
      generating, through a second sense capacitor, a second sense signal in response to linear acceleration along a first axis;
      generating a reference signal through a reference capacitor formed from an electrode disposed on the substrate and a beam rigidly connected to the substrate; and
      combining the second sense signal with the reference signal.

10. The method of claim 9, wherein the first rotational axis and the first axis are parallel to one another.

11. The method of claim 9, wherein the first rotational axis and the first axis are perpendicular to one another.

12. The method of claim 9, further comprising sensing linear motion of the proof mass by generating, through a third sense capacitor, a third sense signal in response to linear acceleration along a second axis different than the first axis.

13. The method of claim 9, further comprising sensing angular motion of the proof mass by generating, through a third sense capacitor, a third sense signal in response to angular acceleration about a second rotational axis different than the first rotational axis.

14. The method of claim 13, further comprising sensing angular motion of the proof mass by generating, through a fourth sense capacitor, a fourth sense signal in response to angular acceleration about a third rotational axis different than the first and second rotational axes.

15. An angular and linear accelerometer comprising:
   at least one anchor connected to a substrate;
   a proof mass coupled to the at least one anchor via a first plurality of tethers;
   a shuttle mass coupled to the proof mass via a second plurality of tethers;
   a first sense capacitor formed at least partially from the proof mass, the first sense capacitor being configured to generate a first sense signal in response to angular motion of the proof mass; and
   a second sense capacitor formed at least partially from the shuttle mass, the second sense capacitor being configured to generate a second sense signal in response to motion of the shuttle mass.

16. The angular and linear accelerometer of claim 15, wherein the second sense capacitor is configured to generate the second sense signal in response to angular motion of the shuttle mass,
   wherein the second plurality of tethers define a rotation axis for the shuttle mass, and
   wherein the shuttle mass has a center of gravity that is offset relative to the rotation axis.

17. The angular and linear accelerometer of claim 16, wherein the shuttle mass comprises first and second mass portions disposed on opposite ends of the shuttle mass relative to the rotation axis, the first and second mass portions having different weights,
   wherein the second sense capacitor is formed from the first mass portion and a first electrode disposed on the substrate, and
   further comprising a third sense capacitor formed from the second mass portion and a second electrode disposed on the substrate.

18. The angular and linear accelerometer of claim 15, wherein the second sense capacitor is configured to generate the second sense signal in response to linear motion of the shuttle mass, and wherein
   the second sense capacitor is formed from a free-end beam connected to the shuttle mass and a fixed electrode anchored to the substrate.

19. The angular and linear accelerometer of claim 15, wherein first sense capacitor is formed from a free-end beam connected to the proof mass and a fixed electrode anchored to the substrate.

20. The angular and linear accelerometer of claim 15, wherein the proof mass is heavier than the shuttle mass.

* * * * *